US012574260B2

(12) United States Patent
Shao

(10) Patent No.: US 12,574,260 B2
(45) Date of Patent: Mar. 10, 2026

(54) CONSENSUS PROCESSING METHOD, APPARATUS, AND SYSTEM FOR BLOCKCHAIN NETWORK, DEVICE, AND MEDIUM

(71) Applicant: Tencent Cloud Computing (Beijing) Co., Ltd., Beijing (CN)

(72) Inventor: Zhuguang Shao, Beijing (CN)

(73) Assignee: Tencent Cloud Computing (Beijing) Co., Ltd., Beijing (CN)

( * ) Notice: Subject to any disclaimer, the term of this patent is extended or adjusted under 35 U.S.C. 154(b) by 364 days.

(21) Appl. No.: 18/314,111

(22) Filed: May 8, 2023

(65) Prior Publication Data

US 2023/0275772 A1 Aug. 31, 2023

Related U.S. Application Data

(63) Continuation of application No. PCT/CN2021/106607, filed on Jul. 15, 2021.

(30) Foreign Application Priority Data

Jun. 4, 2021 (CN) .......................... 202110626245.5

(51) Int. Cl.
*H04L 9/00* (2022.01)
*H04L 9/32* (2006.01)

(52) U.S. Cl.
CPC .............. *H04L 9/50* (2022.05); *H04L 9/3265* (2013.01)

(58) Field of Classification Search
CPC ..... H04L 9/50; H04L 9/3265; H04L 67/1095; H04L 9/3236; H04L 63/12
See application file for complete search history.

(56) References Cited

U.S. PATENT DOCUMENTS

2019/0280879 A1 9/2019 Lin
2020/0120019 A1 4/2020 Chen et al.
(Continued)

FOREIGN PATENT DOCUMENTS

CN 109345386 A 2/2019
CN 109379397 A 2/2019
(Continued)

OTHER PUBLICATIONS

China National Intellectual Property Administration (CNIPA) Office Action 1 for 202110626245.5 Oct. 24, 2022 10 Pages (including translation).

(Continued)

*Primary Examiner* — Nicholas R Taylor
*Assistant Examiner* — Tania M Pena-Santana
(74) *Attorney, Agent, or Firm* — Anova Law Group, PLLC

(57) ABSTRACT

A consensus processing method includes: obtaining an associated set, the associated set including a plurality of pieces of block associated data, the plurality of pieces of block associated data including a plurality of pieces of block shard data, and the plurality of pieces of block shard data being obtained by dividing a service block on which consensus is to be reached; transmitting a part of the block associated data in the associated set to the second consensus nodes, so that the second consensus nodes broadcast, to each other, the block associated data received by each other and restore the service block; and reaching consensus on the service block between the first consensus node and the plurality of second consensus nodes.

16 Claims, 15 Drawing Sheets

(56)          References Cited

U.S. PATENT DOCUMENTS

| | | | | | |
|---|---|---|---|---|---|
| 2020/0162264 | A1* | 5/2020 | Zamani | ................ | H04L 9/3297 |
| 2021/0067319 | A1* | 3/2021 | Chung | ................... | G06F 18/22 |
| 2021/0109825 | A1 | 4/2021 | Liao | | |
| 2021/0248030 | A1* | 8/2021 | Deng | ..................... | G06F 11/10 |
| 2021/0314162 | A1 | 10/2021 | Li | | |
| 2021/0334157 | A1* | 10/2021 | Kannan | ................ | G06F 3/0619 |

FOREIGN PATENT DOCUMENTS

| | | | |
|---|---|---|---|
| CN | 110400140 | A | 11/2019 |
| CN | 111406252 | A | 7/2020 |
| CN | 111415161 | A | 7/2020 |
| CN | 111526218 | A | 8/2020 |
| CN | 111585751 | A | 8/2020 |
| CN | 112835743 | A | 5/2021 |

OTHER PUBLICATIONS

The World Intellectual Property Organization (WIPO) International Search Report for PCT/CN2021/106607 Mar. 2, 2022 12 Pages (including translation).

* cited by examiner

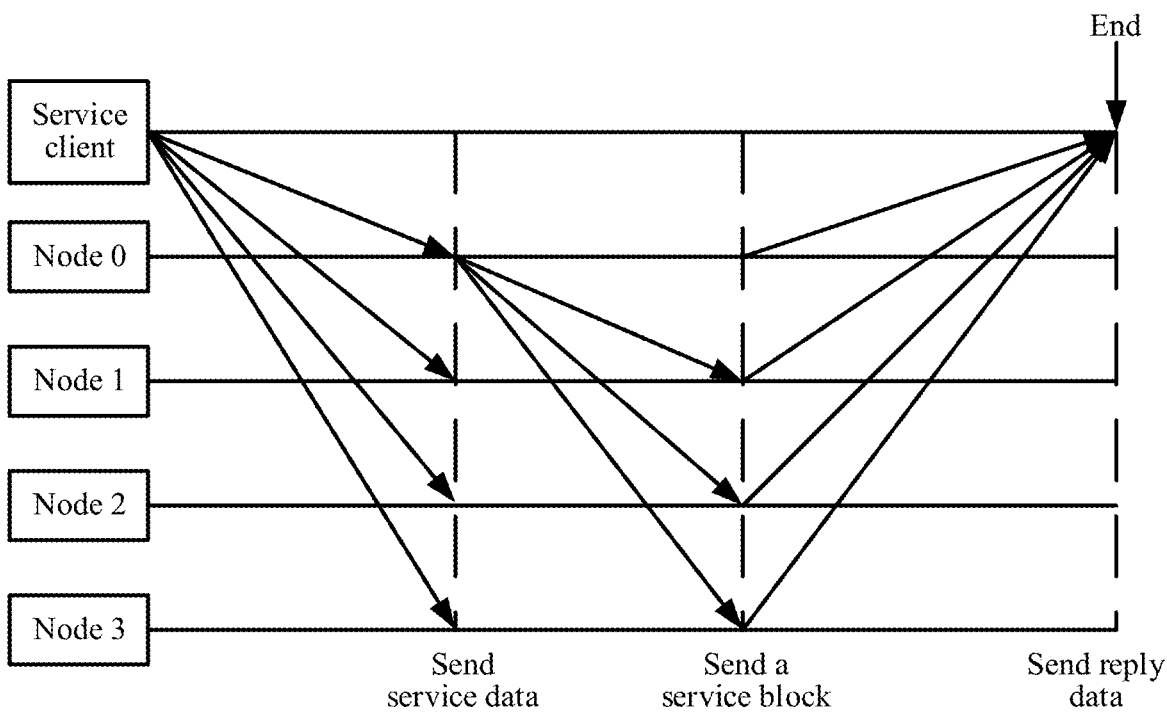

FIG. 12

Obtain a first associated set, where the first associated set    S201
  includes a plurality of pieces of service associated data,
the plurality of pieces of service associated data include a
plurality of pieces of service shard data, and the plurality
  of pieces of service shard data are obtained by dividing
                    service data Send a part of service associated data in the first    S202
associated set to each consensus node in the blockchain
  network, where each consensus node includes a first
  consensus node and a plurality of second consensus
nodes, so that each second consensus node sends service
  associated data respectively received by the second
consensus node to the first consensus node, and the first
consensus node restores the service data based on the
received service associated data and performs consensus
           processing on the service data

FIG. 13

CONSENSUS PROCESSING METHOD, APPARATUS, AND SYSTEM FOR BLOCKCHAIN NETWORK, DEVICE, AND MEDIUM

CROSS-REFERENCES TO RELATED APPLICATIONS

This application is a continuation application of PCT Patent Application No. PCT/CN2021/106607, entitled "CONSENSUS PROCESSING METHOD AND APPARATUS FOR BLOCKCHAIN NETWORK, DEVICE, SYSTEM, AND MEDIUM" and filed on Jul. 15, 2021, which claims priority to Chinese Patent Application No. 202110626245.5, entitled "CONSENSUS PROCESSING METHOD AND APPARATUS FOR BLOCKCHAIN NETWORK, COMPUTER DEVICE, AND MEDIUM" and filed on Jun. 4, 2021, the entire contents of both of which are incorporated herein by reference.

FIELD OF THE TECHNOLOGY

The present disclosure relates to the field of computer technologies, and in particular, to a consensus processing method, apparatus, and system for a blockchain network, a device, and a medium.

BACKGROUND OF THE DISCLOSURE

Blockchain (Blockchain) is essentially a decentralized database with high data storage security. Before data is stored in a blockchain network, the data needs to be cochained, and the data is stored in the blockchain network after the completion of the cochaining.

In related technologies, if a piece of data is to be cochained in a blockchain network, consensus needs to be reached for the data in the blockchain network, and cochaining can be completed after the consensus is reached. For example, a leader node can package, into a block, service data that needs to be cochained, and broadcast the block to each consensus node in the blockchain network, and each consensus node reaches consensus on the obtained block.

Since a volume of service data that needs to be cochained may be very large, a data volume of the block obtained by the leader node by packaging the service data is also very large. Therefore, in a process in which the leader node broadcasts the block to each consensus node in the blockchain network, a volume of data sent by the leader node is very large, which easily causes a single-point bottleneck.

SUMMARY

The present disclosure provides a consensus processing method, apparatus, and system for a blockchain network, a device, and a medium, to reduce a volume of data sent by a leader node of a blockchain network and avoid that the leader node forms a single-point bottleneck.

According to one aspect, a consensus processing method for a blockchain network is provided. The blockchain network includes a first consensus node and a plurality of second consensus nodes, the method is executed by the first consensus node, and the method includes: obtaining an associated set, where the associated set includes a plurality of pieces of block associated data, the plurality of pieces of block associated data includes a plurality of pieces of block shard data, and the plurality of pieces of block shard data are obtained by dividing a service block on which consensus is to be reached; transmitting a part of the block associated data in the associated set to the second consensus nodes respectively, so that the second consensus nodes broadcast, to each other, the block associated data received by each other and restore the service block; and reaching consensus on the service block between the first consensus node and the plurality of second consensus nodes.

According to another aspect, a consensus processing method for a blockchain network is provided. Consensus nodes in the blockchain network include a first consensus node and a plurality of second consensus nodes, the method is executed by a service client, and the method includes: obtaining an associated set, where the associated set including a plurality of pieces of service associated data, the plurality of pieces of service associated data including a plurality of pieces of service shard data, and the plurality of pieces of service shard data being obtained by dividing service data; and transmitting a part of service associated data in the associated set to a consensus node in the blockchain network respectively, so that each second consensus node transmits the received part of service associated data to the first consensus node, and the first consensus node restores the service data based on the received service associated data and performs consensus processing on the service data.

According to one aspect, a consensus processing apparatus for a blockchain network is provided. The blockchain network includes a first consensus node hosted by the apparatus and a plurality of second consensus nodes, and the apparatus includes: an associated data obtaining module, configured to obtain an associated set, the associated set including a plurality of pieces of block associated data, the plurality of pieces of block associated data including a plurality of pieces of block shard data, and the plurality of pieces of block shard data being obtained by dividing a service block on which consensus is to be reached; an associated data transmission module, configured to transmit a part of block associated data in the associated set to the second consensus nodes, so that the second consensus nodes broadcast, to each other, block associated data received by each other and restore the service block; and a consensus module, configured to reach consensus on the service block between the first consensus node and the plurality of second consensus nodes.

According to another aspect, a consensus processing apparatus for a blockchain network is provided. Consensus nodes in the blockchain network include a first consensus node and a plurality of second consensus nodes, and the apparatus includes: an associated data obtaining module, configured to obtain an associated set, the associated set including a plurality of pieces of service associated data, the plurality of pieces of service associated data including a plurality of pieces of service shard data, and the plurality of pieces of service shard data being obtained by dividing service data; and an associated data transmission module, configured to transmit a part of service associated data in the associated set to each consensus node in the blockchain network, so that each second consensus node transmits service associated data respectively received by the second consensus node to the first consensus node, and the first consensus node restores the service data based on the received service associated data and performs consensus processing on the service data.

According to another aspect, a computer device is provided, including: a memory and a processor, the memory storing a computer program, and the computer program, when executed by the processor, causing the processor to perform the foregoing consensus processing method for a blockchain network.

According to another aspect, a non-transitory computer-readable storage medium is provided, storing a computer program, the computer program including program instructions, and the program instructions, when executed by a processor, causing the processor to perform the foregoing consensus processing method for a blockchain network.

In the present disclosure, the first consensus node can be used as a leader node of the blockchain network, and the first consensus node obtains the associated set corresponding to the service block, where the block associated data in the associated set includes a plurality of pieces of block shard data obtained by dividing the service block, and sends a part of block shard data in the associated set to the second consensus nodes. The second consensus nodes broadcast, to each other, the block shard data received by each other, and restore the service block based on the block shard data sent by the first consensus node and the block shard data broadcast by other second consensus nodes. The first consensus node and each second consensus node perform consensus processing on the service block. In this method, the first consensus node sends block associated data to each second consensus node, instead of sending the complete service block to each second consensus node, each second consensus node can restore the service block, and then the first consensus node and each second consensus node reach consensus on the service block. A data volume of each piece of block associated data is much smaller than a data volume of the service block, which can greatly reduce a volume of data sent by the first consensus node and avoid that the first consensus node forms a single-point bottleneck.

BRIEF DESCRIPTION OF THE DRAWINGS

To describe the technical solutions in the present disclosure or the related technology more clearly, the following briefly describes the accompanying drawings required for describing the embodiments or the related technology. Apparently, the accompanying drawings in the following descriptions show merely some embodiments of the present disclosure, and a person of ordinary skill in the art may still derive other drawings from these accompanying drawings without creative efforts.

FIG. 12 is a schematic diagram of a data sending scenario in a related technology according to the present disclosure;

FIG. 13 is a schematic flowchart of another consensus processing method for a blockchain network according to the present disclosure;

DESCRIPTION OF EMBODIMENTS

Figure 1:
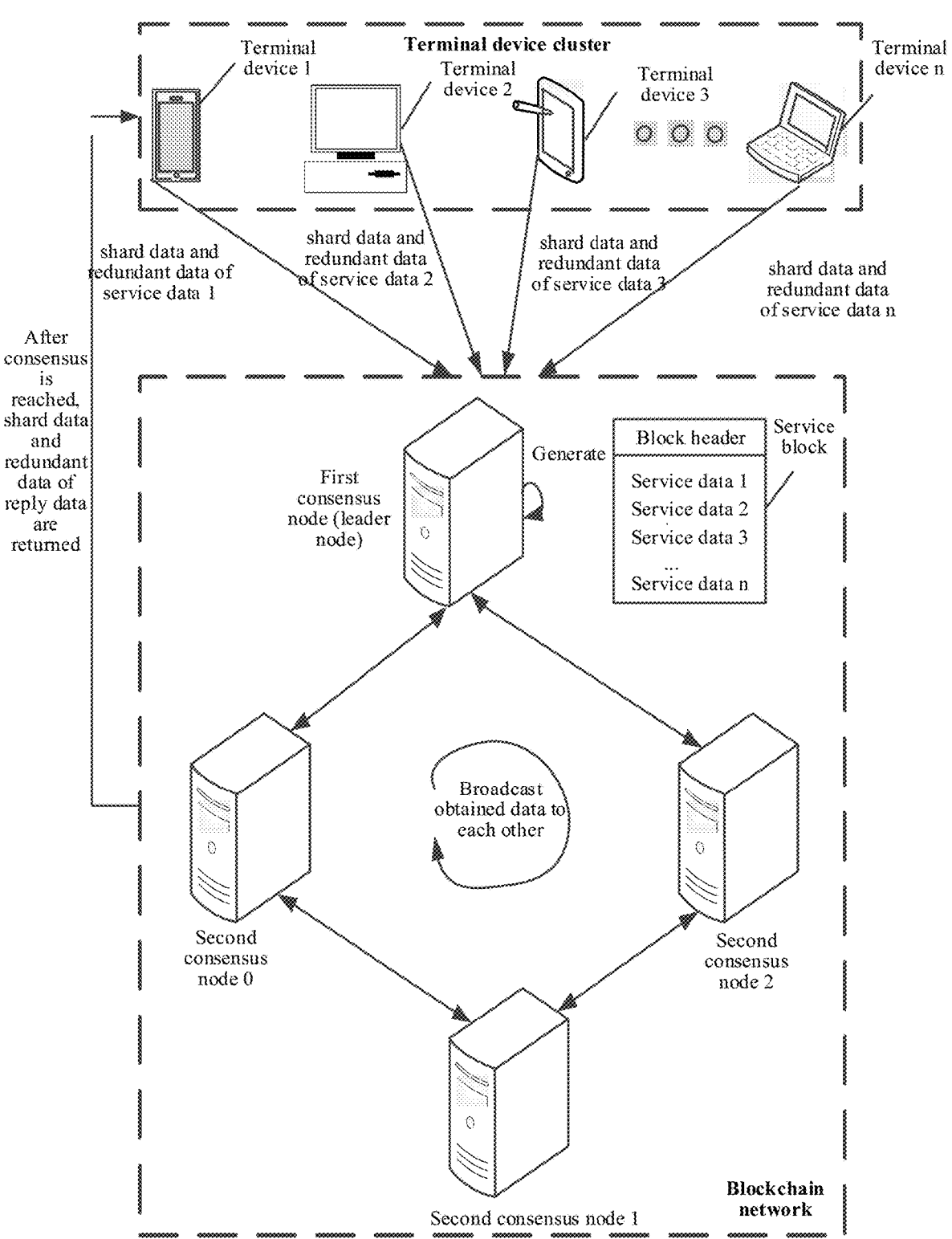
FIG. 1 is a schematic structural diagram of a network architecture according to an embodiment of the present disclosure.

The technical solutions in the present disclosure are clearly and completely described in the following with reference to the accompanying drawings in the present disclosure. Apparently, the described embodiments are merely some rather than all of the embodiments of the present disclosure. All other embodiments obtained by a person of ordinary skill in the art based on the embodiments of the present disclosure without creative efforts shall fall within the protection scope of the present disclosure.

The present disclosure also involves related technologies of blockchains (Blockchain). A blockchain is a new application mode of computer technologies such as distributed data storage, point-to-point transmission, consensus mechanisms, and encryption algorithms. A blockchain is essentially a decentralized database and is a string of data blocks associated with cryptographic methods. Each data block includes a batch of network transaction information and is used to verify the validity of information thereof (anti-counterfeiting) and generate a next block. A blockchain can include a blockchain underlying platform, a platform product service layer, and an application service layer. A blockchain includes a series of blocks (Block) that are consecutive in a chronological order of generation times. Once a new block is added to the blockchain, the new block is no longer removed. The block records recorded data committed by a node in a blockchain system. Related blockchain technologies in the present disclosure mainly refer to a process of consensus cochaining of service data in a blockchain network.

In a process of consensus cochaining of service data in this related technology, a leader node of the blockchain network broadcasts, to K consensus nodes of the blockchain network, service block to which the service data belongs, and the leader node and the K consensus nodes reach consensus on the service block, where K is a positive integer greater than 1. In the embodiments of the present disclosure, a data volume of the service block may be very large, and the leader node broadcasts the service block to the K consensus nodes. Assuming that the data volume of the service block is Q and a volume of data sent by the leader node is Q*K, the volume of the data sent by the leader node is very large and it is easy to form a single-point bottleneck. When the number K of consensus nodes in the blockchain network is large, the volume of the data sent by the leader node rapidly increases, and even a single-point bottleneck and communication collapse occur.

For this reason, in the embodiments of the present disclosure, the leader node obtains a plurality of pieces of block associated data, where the plurality of pieces of block associated data include a plurality of pieces of block shard data obtained by dividing or partitioning the service block, and sends a part of the plurality of pieces of block associated data to each consensus node. Different consensus nodes may receive the same or different parts of the block associated data. All consensus nodes broadcast, to each other, the block associated data received by each other, so that each consensus node receives the plurality of pieces of block associated data, and restores the service block based on the plurality of pieces of block associated data. Then, the leader node and each consensus node performs consensus processing on the service block. A data volume of the plurality of pieces of block shard data is equal to Q, which greatly reduces a volume of data sent by the leader node.

FIG. 1 is a schematic structural diagram of a network architecture according to an embodiment of the present disclosure. As shown in FIG. 1, the network architecture may include a blockchain network and a terminal device cluster, and the terminal device cluster may include one or more terminal devices, where a number of terminal devices is not limited herein. As shown in FIG. 1, the plurality of terminal devices may specifically include a terminal device 1, a terminal device 2, a terminal device 3, . . . , and a terminal device n. The blockchain network may include a plurality of consensus nodes, where the plurality of consensus nodes may include a first consensus node, a second consensus node 0, a second consensus node 1, and a second consensus node 2. The first consensus node is a leader node (leader node) and can package service data into a block. As shown in FIG. 1, the terminal device 1, the terminal device 2, the terminal device 3, . . . , and the terminal device n can all be connected to each consensus node in the blockchain network, so that each terminal device can exchange data with each consensus node through network connection.

Each consensus node shown in FIG. 1 can be an independent physical server, or a server cluster including a plurality of physical servers, or a distributed system, and can also be a cloud server that provides basic cloud computing services such as cloud services, cloud databases, cloud computing, cloud functions, cloud storage, network services, cloud communication, middleware services, domain name services, security services, CDN, and big data and artificial intelligence platforms. The terminal device may be intelligent terminals such as smartphones, tablet computers, laptop computers, desktop computers, and smart TVs.

In an embodiment, each terminal device in the terminal device cluster may include a service client, and the service client in each terminal device may obtain a plurality of pieces of service associated data corresponding to service data of the service client. The plurality of pieces of service associated data include a plurality of pieces of service shard data obtained by dividing the service data, and/or service redundant data obtained by performing redundant calculation on the plurality of pieces of service shard data. The service client sends a part of the plurality of pieces of service associated data to each consensus node in the blockchain network. Different consensus nodes may receive the same or different parts of the service associated data. For example, herein, a service client in the terminal device 1 can send service associated data corresponding to service data 1 of the service client to each consensus node, a service client in the terminal device 2 can send service associated data corresponding to service data 2 of the service client to each consensus node, a service client in the terminal device 3 can send service associated data corresponding to service data 3 of the service client to each consensus node, . . . , and a service client in the terminal device n can send service associated data corresponding to service data n of the service client to each consensus node. For specific descriptions of service associated data, refer to descriptions in an embodiment corresponding to FIG. 2 below.

A service client can send service associated data corresponding to service data of the service client to a consensus node, and then each second consensus node in the blockchain network sends service associated data received by the second consensus node to the first consensus node, so that the first consensus node receives a plurality of pieces of service associated data corresponding to the service data and restores the service data of the service client (including service data 1, service data 2, service data 3, . . . , and service data n) based on the plurality of pieces of service associated data. For a process of restoring the service data by the first consensus node based on the received service associated data, refer to descriptions in the embodiment corresponding to FIG. 2 below.

When the first consensus node restores the service data 1, the service data 2, the service data 3, . . . , and the service data n, the first consensus node packages the service data 1, the service data 2, the service data 3, . . . and the service data n into a block. The block can be referred to as a service block, the service block can include a block header and a block body, and the block body can include the service data 1, the service data 2, the service data 3, . . . , and the service data n.

In an embodiment, the service client in each terminal device sends service data of the service client to the first consensus node. For example, a service client in the terminal device 1 sends service data 1 of the service client to the first consensus node, a service client in the terminal device 2 sends service data 2 of the service client to the first consensus node, a service client in the terminal device 3 sends service data 3 of the service client to the first consensus node, . . . , and a service client in the terminal device n sends service data n of the service client to the first consensus node. The first consensus node may package the service data 1, the service data 2, the service data 3, . . . and the service data n into a service block, where the service block can include a block header and a block body, and the block body can include the service data 1, the service data 2, the service data 3, . . . , and the service data n.

The first consensus node can obtain a plurality of pieces of block associated data corresponding to the service block, and the plurality of pieces of block associated data include a plurality of pieces of block shard data obtained by dividing the service block, and/or block redundant data obtained by performing redundant calculation on the plurality of pieces of block shard data. The first consensus node sends a part of the plurality of pieces of block associated data to each second consensus node. All second consensus nodes can broadcast the block associated data received by the second consensus nodes to each other, so that each second consensus node can receive the plurality of pieces of block associated data, and restore the service block based on the plurality of pieces of block associated data. For specific descriptions of block shard data, block redundant data, and how the second consensus node restores the service block based on the plurality of pieces of block associated data, refer to descriptions in the embodiment corresponding to FIG. 2 below.

After each second consensus node restores the service block, the first consensus node and each second consensus node can jointly reach consensus on the service block. After detecting that consensus on the service block is reached, each consensus node can return reply associated data of corresponding reply data to each service client. The reply associated data is reply shard data obtained by dividing the reply data, or reply redundant data (the reply redundant data can reduce the possibility that the reply shard data is lost or tampered with) obtained by performing redundant calculation on the reply shard data obtained by sharding. Different service clients can correspond to different reply data. Each service client can restore reply data of service data of the service client based on reply associated data obtained by the service client. The reply data can be confirmation information for the service data, such as information for confirming the completion of service transactions or confirming service data cochaining. For a process of restoring the reply data by the service client based on the obtained reply shard data and reply redundant data, refer to descriptions in an embodiment corresponding to FIG. 13 below.

In the method provided in the present disclosure, the service data, the service block, and the reply data can be sent through corresponding associated data (for example, the block associated data, the service associated data, and the reply associated data). Therefore, this can reduce a volume of communication data of each process, increase the communication speed of each process, and reduce communication complexity of each process, thereby improving communication stability of the blockchain network.

Figure 2:
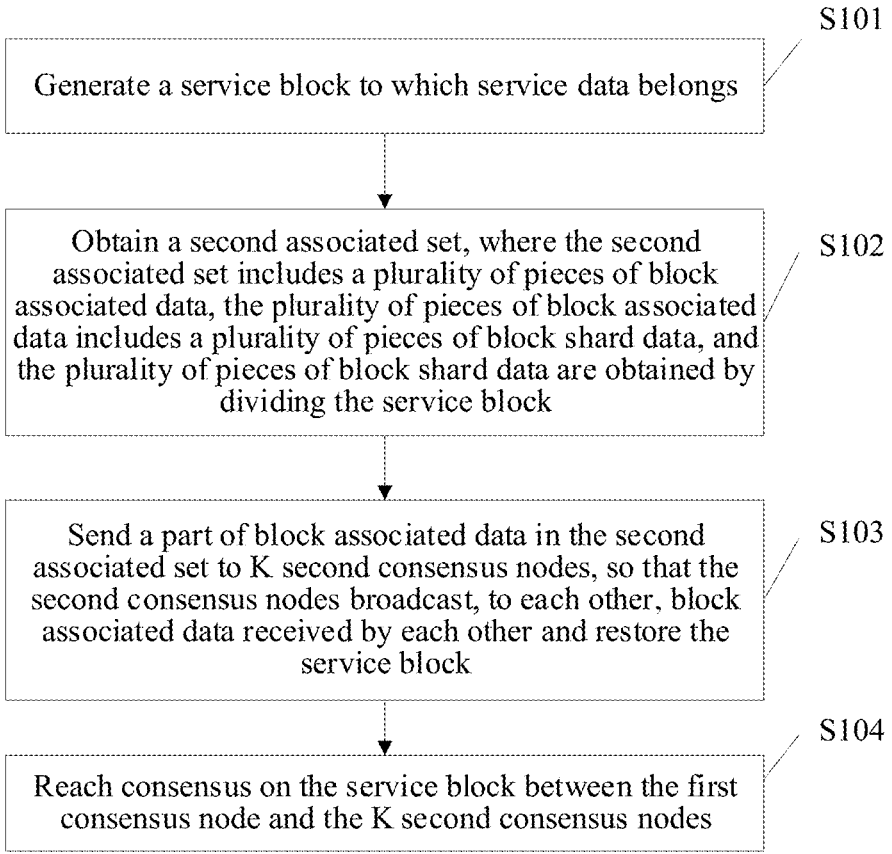
FIG. 2 is a schematic flowchart of a consensus processing method for a blockchain network according to the present disclosure.

FIG. 2 is a schematic flowchart of a consensus processing method for a blockchain network according to the present disclosure. As shown in FIG. 2, for example, the method is executed by a first consensus node, and the method may include:

Step S101: Generate a service block to which service data belongs.

In some embodiments, consensus nodes in the blockchain network include a first consensus node and K second consensus nodes. A consensus node can include one or more computer devices, and a computer device can be a server or a terminal device. In an embodiment, the first consensus node is a leader node, and the executive body in this embodiment of the application may be the first consensus node. In step S101, the first consensus node may obtain at least one piece of service data, and package the at least one piece of service data to generate a service block to which the at least one piece of service data belongs.

The service data packaged by the first consensus node may include service data of one service client, or may include service data generated by a plurality of service clients at the same time. Therefore, the service block may include necessary elements of a block, for example, elements such as a Merkle tree root and a block height, and the service block can also include service data of one service client or a service data set obtained by packaging service data of a plurality of service clients.

Since principles of obtaining the service data of each service client by the first consensus node and manners of processing the service data of each service client are the same and independent, a process of processing service data of one service client is used as an example for illustration. That is, regardless of whether there is one piece of service data or a plurality of pieces of service data, one piece of service data and a plurality of pieces of service data are collectively referred to as service data in this embodiment of the application.

The process of obtaining the service data of the service client by the first consensus node can be performed in the following two manners:

In a first manner, the first consensus node receives the service data sent by the service client.

In the first manner, when the service client has service data to be sent, the service client sends the service data to the first consensus node, and the first consensus node directly receives the service data.

In the first manner, the service client may not send the service data to each second consensus node.

In a second manner, the first consensus node receives a plurality of pieces of service associated data, where the plurality of pieces of service associated data include first service associated data that is transmitted by a service client and second service associated data that is transmitted by the service client and forwarded by each second consensus node, the plurality of pieces of service associated data include a plurality of pieces of service shard data, and the plurality of pieces of service shard data are obtained by the service client by dividing the service data. The first consensus node restores the service data based on the plurality of pieces of service associated data.

In the second manner, the service client obtains the first associated set of service data, where the first associated set includes a plurality of pieces of service associated data, and sends a part of the service associated data in the first associated set to each consensus node (including the first consensus node and the K second consensus nodes) in the blockchain network.

In some embodiments, the service client divides the service data to obtain a plurality of pieces of service shard data, and the plurality of pieces of service associated data in the first associated set include the plurality of pieces of service shard data. The service client sends one or more pieces of service associated data in the first associated set to the first consensus node, and sends one or more pieces of service associated data in the first associated set to any second consensus node.

In some embodiments, the service client performs redundant calculation on the plurality of pieces of service shard data, to obtain at least one piece of service redundant data, and the plurality of pieces of service associated data in the first associated set also include the at least one piece of service redundant data.

When a network environment of the blockchain network is good, and the data sent by the service client to each consensus node in the blockchain network is less likely to be lost or tampered with, the first associated set includes the plurality of pieces of service shard data, and may not include the at least one piece of service redundant data or may include the at least one piece of service redundant data.

The at least one piece of service redundant data is used to restore lost or tampered service shard data of the plurality of pieces of service shard data. That is, even if a part of the service shard data sent by the service client to the consensus node in the blockchain network is lost or tampered with, the consensus node can use the at least one piece of service redundant data to restore the lost or tampered service shard data, to improve the security of transmission of service shard data.

In some embodiments, the service client divides the service data and obtains the service redundant data by using an erasure code technology. First, the erasure code technology is explained: The erasure code technology is a new scalable data protection method. By using the erasure code technology, a large block of data can be cut to obtain several data blocks included in the large block of data, and then redundant calculation is performed on the several data blocks, and a redundant calculation result and the several data blocks are used to perform storage and writing of the large block of data. Due to the introduction of redundant calculation of the data block, even if some small data blocks are lost, the redundant calculation result may be used to restore the lost data block.

In view of this, the large block of data in the present disclosure may refer to the following service block, service data, or reply data for service data. When the large block of data is a service block, several data blocks obtained by cutting the service block by using the erasure code technology are several pieces of block shard data, and a redundant calculation result of the several pieces of block shard data is several pieces of block redundant data. When the large block of data is service data, several data blocks obtained by cutting the service data by using the erasure code technology are several pieces of service shard data, and a redundant calculation result of the several pieces of service shard data is several pieces of service redundant data. When the large block of data is reply data, several data blocks obtained by cutting the reply data by using the erasure code technology are several pieces of reply shard data, and a redundant calculation result of the several pieces of reply shard data is several pieces of reply redundant data. For a specific process of cutting the service block, the service data, or the reply data for service data by using the erasure code technology and then performing transmission, refer to the following descriptions.

Therefore, the service client can divide/partition (that is, cut) service data of the service client by using the erasure code technology. Since the service client needs to send data to each consensus node in the blockchain network, the service client can determine a number of service data shards according to the number of all consensus nodes in the blockchain network. Herein, the number of first consensus nodes is usually 1. Because the number of second consensus nodes is K, the number of all consensus nodes (which can be referred to as a total number of nodes) in the blockchain network is K+1.

In some embodiments, the service client can obtain a service redundant number G for the service data, and the service redundant number G indicates a number of pieces of redundant data (redundant data can also be referred to as redundant code) that are of the service data and that the service client needs to generate. The redundant data of the service data can be referred to as service redundant data. Therefore, a number of shards (which can be denoted as a service shard number W) into which the service client needs to divide the service data can be (K+1)−G. In other words, a sum of G and W is equal to K+1.

The service redundant number G and the service shard number W are both positive integers, and a specific value of G can be determined according to the actual application scenario. For example, the value of G can be preset by the developer, or can be determined according to a network stability level of the blockchain network. The more stable blockchain network indicates the smaller G, and the more unstable blockchain network indicates the larger G. For example, G can be equal to 1, 2, 3, or the like. When the blockchain network is relatively stable, G can be a small value such as 2. When the blockchain network is unstable, G can be a large value such as 5. However, generally, G is smaller than W.

The service data may include D pieces of field data, D is a positive integer, a specific value of D is determined according to the actual application scenario, and the field data included in the service data may be referred to as service field data.

In some embodiments, D is usually an integer greater than 1, that is, the service data includes a plurality of pieces of service field data. The service client can divide, based on the service shard number W, the D pieces of service field data included in the service data, to obtain W pieces of service shard data. One piece of service shard data can include a part of service field data in the service data, that is, one piece of service segment data includes one or more pieces of service field data.

In some embodiments, the service client can obtain G pieces of service redundant data of the service data based on the W pieces of service shard data. An obtaining process is: The service client can respectively perform redundant calculation on the W pieces of service shard data based on G different redundant algorithms, to obtain service redundant data corresponding to each redundant algorithm, that is, obtain G pieces of service redundant data.

In some embodiments, any one of the G redundant algorithms may be any algorithm, such as addition, multiplication, division, subtraction, or a combination of a plurality of algorithms. In a redundant algorithm, the W pieces of service shard data are calculated together to obtain one piece of service redundant data corresponding to the redundant algorithm. It can be understood that a redundant algorithm is a process of associating the W pieces of service shard data. For example, a redundant algorithm can be addition. Then, values (such as binary values or decimal values) corresponding to the W pieces of service shard data can be added together, and a result of the addition can be used as service redundant data corresponding to the redundant algorithm. Different redundant service data can be obtained by calculating the W pieces of service shard data based on different redundant algorithms, and one piece of service redundant data can also include several pieces of field data.

In the foregoing process, the service client obtains the W pieces of service shard data and the G pieces of service redundant data, and a set formed by the W pieces of service shard data and the G pieces of service redundant data can be referred to as the first associated set of the service data. The first associated set includes W+G pieces of service associated data in total, and one piece of service associated data can be one piece of service shard data or one piece of service redundant data.

Next, the service client can send each piece of service associated data in the first associated set to each consensus node in the blockchain network. The service client sends one piece of service associated data to one consensus node, and the service associated data sent to each consensus node may be different. The service associated data sent by the service client to the first consensus node may be referred to as first service associated data, and the first service associated data may be any service associated data in the first associated set. The service associated data sent by the service client to the second consensus node can be referred to as the second service associated data, and the second service associated data sent to any second consensus node is any service associated data in the first associated set.

In some embodiments, after the first consensus node and the K second consensus nodes respectively receive corresponding service associated data, the first consensus node and the K second consensus nodes can broadcast, to each other, the service associated data received by each other, so that each consensus node can restore the service data based on the service associated data received by the consensus node and the service associated data broadcast by other consensus nodes.

Alternatively, in some embodiments, after receiving corresponding second service associated data, the K second consensus nodes may send the second service associated data received by the K second consensus nodes to the first consensus node. The first consensus node receives the first service associated data and the second service associated data sent by the K second consensus nodes. The first consensus node receives K pieces of second service associated data in total, and then restores the service data of the service client according to the first service associated data and the K pieces of second service associated data.

The first consensus node may not be able to receive the first service associated data of the service client and/or the second service associated data sent by one or more second consensus nodes. Therefore, the number of pieces of service shard data received by the first consensus node may be less than W, and the number of pieces of service redundant data received by the first consensus node may be less than G, that is, the number of pieces of received service associated data is less than W+G. When the number of pieces of service associated data received by the first consensus node is greater than or equal to W, the first consensus node restores, based on the received service associated data, service associated data that is not received, and restores the service data based on the received service associated data and the restored service associated data.

A process of restoring service associated data can be understood as a process of solving equations. Since the service client divides the service data into W pieces of service shard data, one piece of service shard data can be understood as an unknown quantity. Therefore, as long as W equations for the service data are obtained, the service data can be restored, and a piece of service associated data of the service data can be understood as an equation of the service data. Therefore, it can be understood that since G+W is usually equal to K+1, if the service redundant number G is larger, the service shard number W can be smaller. Then, service associated data not received by the first consensus node can be restored through fewer equations. Therefore, it can be understood that when the blockchain network is more stable, the service redundant number G can be smaller. This is because the more stable blockchain network indicates that the first consensus node can receive, in a more timely and accurate manner, service associated data sent by more other second consensus nodes, that is, it is less likely that the first consensus node cannot receive the service associated data sent by some second consensus nodes.

In some embodiments, W+G may not be equal to K+1. For example, W is usually greater than G. Therefore, when D is very small, that is, when the number of pieces of service field data included in the service data is very small, and the number of consensus nodes is relatively large, there is no need to divide the service data into many pieces of service shard data. In this case, the service client may send the same service associated data to a plurality of consensus nodes.

In some embodiments, when D is very large, that is, when the number of pieces of service field data included in the service data is relatively large, and the number of consensus nodes is limited, the service data is divided into many pieces of service shard data. In this case, the service client may send a plurality of pieces of different service associated data to one consensus node.

As can be seen from the above descriptions, the first consensus node can receive the first service associated data and K pieces of second service associated data, or can receive the first service associated data and less than K pieces of second service associated data (for example, some second consensus nodes have poor communication quality and fail to broadcast the second service associated data to the first consensus node). As long as the total number of first service associated data and second service associated data received by the first consensus node is greater than or is equal to W, and the W pieces of service associated data are different from each other, the first consensus node can restore the W pieces of service shard data according to the received first service associated data and second service associated data, and aggregate the restored W pieces of service shard data to obtain the service data.

In some embodiments, the service client further obtains a hash value of each service associated data in the first associated set, and constructs a first Merkle tree based on the hash value of each service associated data. In this way, when the service client sends service associated data to any consensus node (the first consensus node or the second consensus node) in the blockchain network, the service client also sends the hash value of the service associated data and a root node of the first Merkle tree.

In some embodiments, the first Merkle tree is a binary tree, and hash values of the W pieces of service shard data and hash values of the G pieces of service redundant data in the first associated set are all leaf nodes of the first Merkle tree. For two child nodes having the same parent node in the first Merkle tree, the parent node is obtained based on hash values of the two child nodes.

For any second consensus node, when receiving the second service associated data, the second consensus node also receives a hash value of the second service associated data and the root node of the first Merkle tree, and sends the second service associated data, the hash value of the second service associated data, and the root node of the first Merkle tree to the first consensus node.

After the service client sends the first service associated data to the first consensus node, the first service associated data may or may not change during transmission in the network. For ease of description, the first service associated data transmitted in the network is referred to as first verification associated data, and the hash value of the first service associated data is referred to as a first verification hash value. Similarly, the second service associated data transmitted in the network is referred to as the second verification associated data, and the hash value of the second service associated data is referred to as the second verification hash value.

In some embodiments, the process of receiving the first service associated data by the first consensus node may be: The first consensus node can receive first verification associated data and a first verification hash value, where the first verification associated data corresponds to the first service associated data transmitted by the service client, and the first verification hash value is a hash value of the first service associated data. The first consensus node calculates a hash value of the first verification associated data, compares whether the hash value of the first verification associated data is the same as the first verification hash value, and if yes, determines the first verification associated data as the first service associated data. In fact, each second consensus node also receives second service associated data of the second consensus node in the same manner as the first consensus node receives the first service associated data.

A process of receiving, by the first consensus node, the second service associated data sent by each second consensus node may be: Any one of the K second consensus nodes can be represented as an $i^{th}$ second consensus node, where i is a positive integer less than or equal to K. Since principles of obtaining, by the first consensus node, the second service associated data sent by second consensus nodes are the same, herein, the process of obtaining, by the first consensus node, the second service associated data sent by the $i^{th}$ second consensus node is used as an example for instruction. Refer to descriptions below.

The first consensus node may receive the second verification associated data and the second verification hash value, the second verification associated data corresponds to the second service associated data that is sent by the service client and received by the $i^{th}$ second consensus node, and the second verification hash value is the hash value obtained by the $i^{th}$ second consensus node by performing hash calculation on the received second service associated data. The first consensus node calculates a hash value of the second verification associated data, compares whether the hash value of the calculated second verification associated data is the same as the second verification hash value, and if yes, determines the second verification associated data as the second service associated data sent by the $i^{th}$ second consensus node.

In some embodiments, when receiving the first service associated data, the first consensus node also receives the root node of the first Merkle tree sent by the service client. The first Merkle tree is a Merkle tree constructed by the service client based on the W pieces of service shard data and the G pieces of service redundant data obtained above.

Therefore, the first consensus node can construct a second Merkle tree based on the hash value of the first service associated data and the hash values of the K pieces of second service associated data in the same manner as that the service client constructs the first Merkle tree. The first consensus node can compare whether a root node of a root structure of the second Merkle tree is the same as the root node of the first service Merkle tree sent by the service client, and if yes, it is considered that the obtained first service associated data and the K pieces of second service associated data are credible, and the service data can be restored based on the obtained first service associated data and second service associated data.

In addition, it is likely that the first consensus node has not obtained all the second service associated data and/or has not obtained the first service associated data. In this case, the first consensus node can restore W pieces of service shard data based on the obtained W or more pieces of service associated data. Since the first consensus node also knows the redundant algorithm for calculating G pieces of service redundant data, the first consensus node can calculate, based on the restored W pieces of service shard data, service redundant data that have not been obtained and that are of the G pieces of service redundant data. In this case, the first consensus node can also construct the second Merkle tree based on hash values of the restored W pieces of service shard data and hash values of the obtained G pieces of service redundant data, compare the root node of the second Merkle tree with the root node of the first Merkle tree sent by the service client, if obtaining through comparison that the root nodes are the same, consider that the restored W pieces of service shard data are credible, and aggregate the restored W pieces of service shard data to obtain the service data of the service client.

In some embodiments, when sending the second service associated data to the first consensus node, each second consensus node also sends, to the first consensus node, the root node of the first Merkle tree sent by the service client. Therefore, the first consensus node can also compare whether the root node of the fourth Merkle tree sent by all the second consensus nodes, the root node of the first Merkle tree sent by the service client, and the root node of the second Merkle tree are consistent, if all the root nodes are consistent or the root node of the first Merkle tree corresponding to the consensus node of the service associated data used to restore the W pieces of service shard data is consistent with the root node of the second Merkle tree, can consider that the restored W pieces of service segment data are credible, and can aggregate the restored W pieces of service segment data to obtain the service data of the service client.

Figure 3:
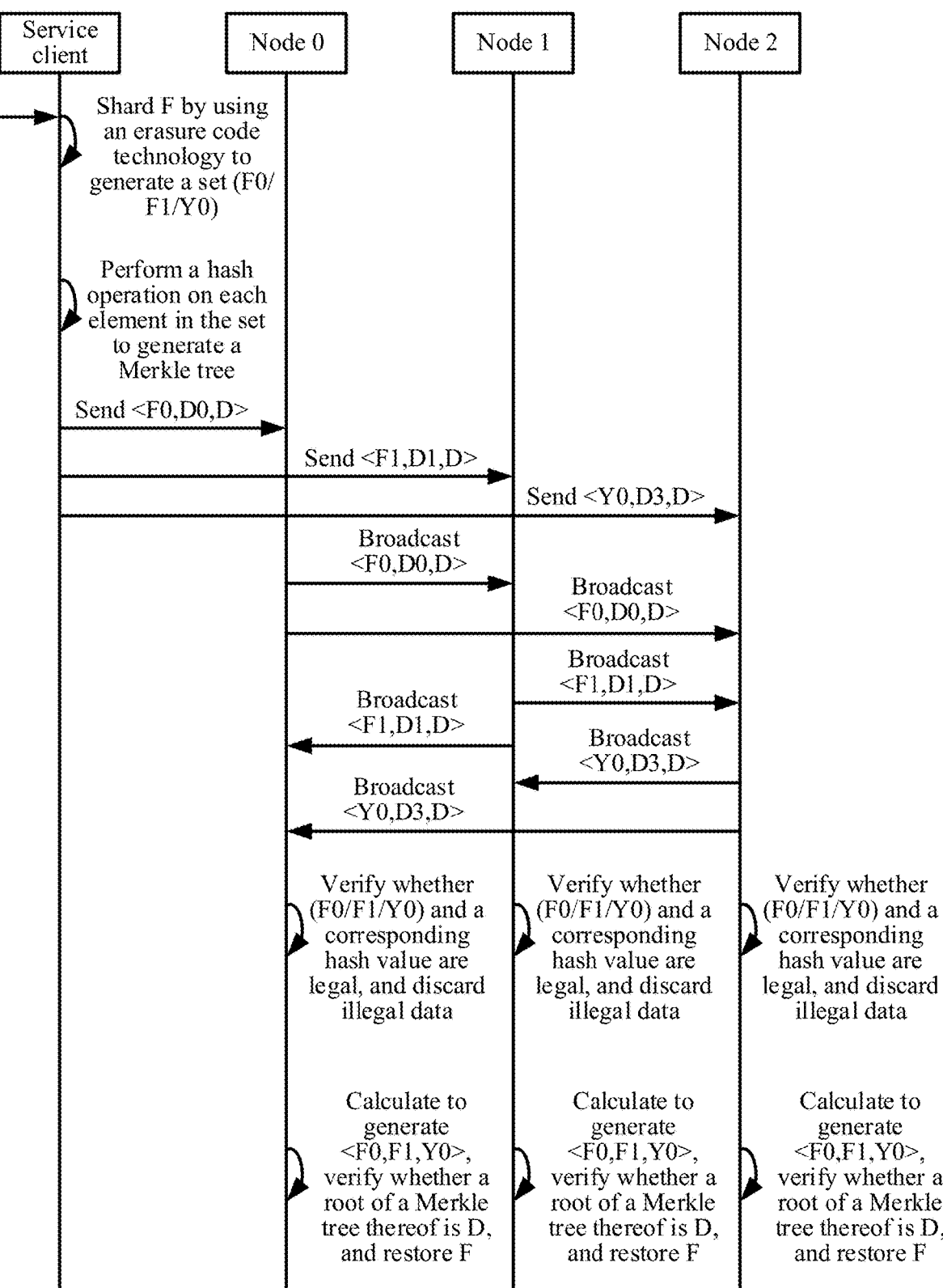
FIG. 3 is a schematic flowchart of obtaining service data by a consensus node according to the present disclosure.
Figure 4:
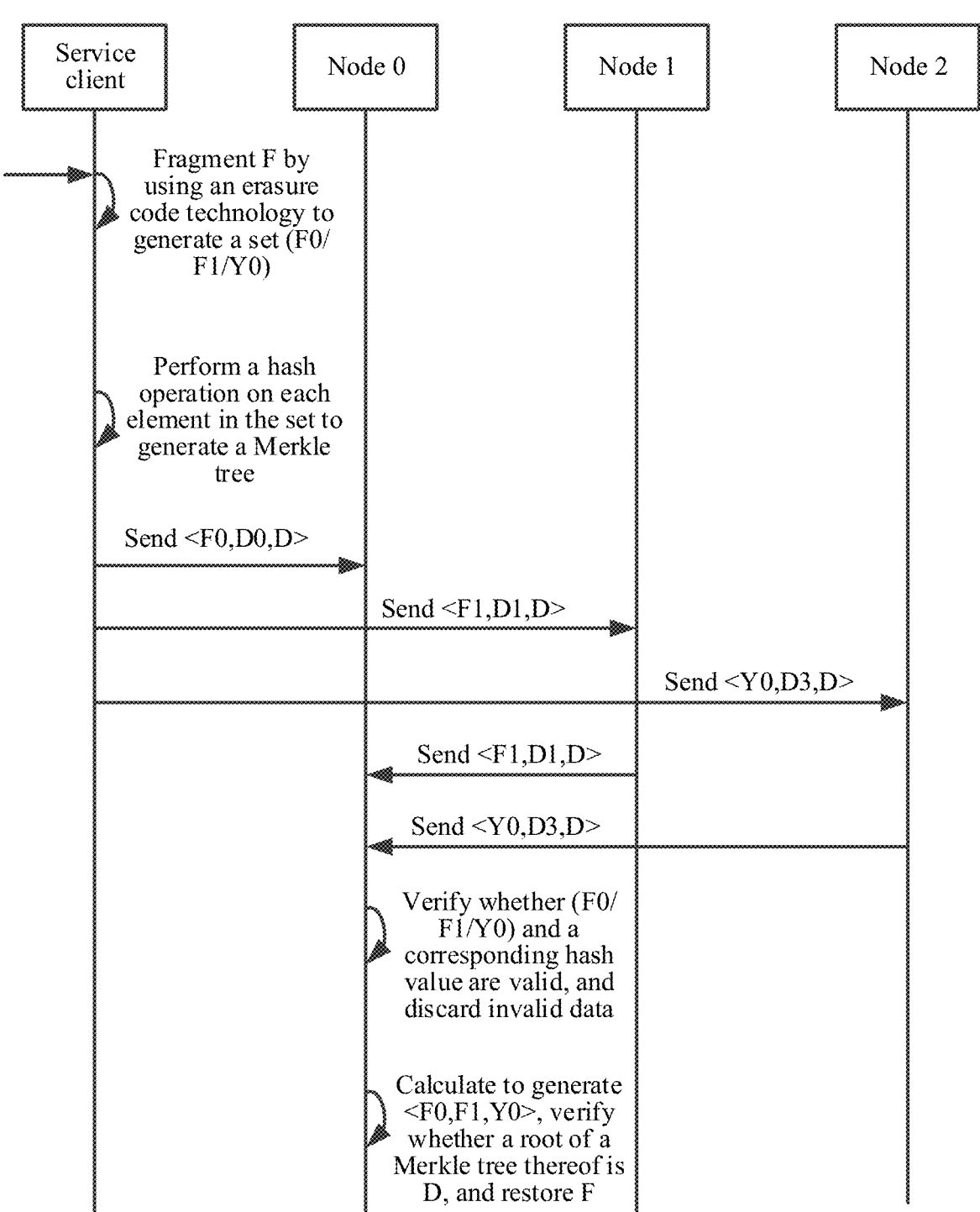
FIG. 4 is another schematic flowchart of obtaining service data by a consensus node according to the present disclosure.

FIG. 3 or FIG. 4 is a schematic flowchart of obtaining service data by a consensus node according to the present disclosure. As shown in FIG. 3 and FIG. 4, first, the service client can divide service data F by using the erasure code technology to obtain a set (F0/F1/Y0). F0 and F1 are two pieces of service shard data obtained by dividing the service data, and Y0 is one piece of service redundant data that is obtained based on F0 and F1 and that is of the service data. The service client can also calculate the hash value of each element (including an element F0, an element F1, and an element Y0) in the set (F0/F1/Y0), and generate the first Merkle tree based on a hash value of each element.

The consensus nodes in the blockchain network include a node 0, a node 1, and a node 2. Therefore, the service client can send <F0, D0, D> to a node 0. <F0, D0, D> includes service shard data F0, the hash value DO of the service shard data F0, and the root node D of the first Merkle tree. The service client can send <F1, D1, D> to a node 1. <F1, D1, D> includes service shard data F1, the hash value D1 of the service shard data F1, and the root node D of the first Merkle tree. The service client can send <Y0, D3, D> to a node 2. <Y0, D3, D> includes service redundant data Y0, the hash value D3 of the service redundant data Y0, and the root node D of the first Merkle tree.

In some embodiments, referring to FIG. 3, the node 0 may broadcast <F0, D0, D> to the node 1 and the node 2, the node 1 may broadcast <F1, D1, D> to the node 0 and the node 2, and the node 2 may broadcast <Y0, D3, D> to the node 0 and the node 1. Therefore, the node 0, the node 1, and the node 2 can verify each element in (F0/F1/Y0) obtained by the node 0, the node 1, and the node 2, for example, verify whether the hash value of each element in the calculated (F0/F1/Y0) and an obtained hash value of each element are valid (for example, whether the hash values are the same), and discard invalid (for example, the calculated hash value is different from the obtained hash value) data in (F0/F1/Y0). For example, when the node 0 obtains <F1, D1, D> broadcast by the node 1, the node 0 can calculate to determine whether the hash value of F1 is the same as D1, if yes, maintain F1, and if not, discard F1. After one piece of data in (F0/F1/Y0) is discarded, correct data corresponding to the discarded data can be restored based on the maintained two other pieces of data. For example, if F1 is discarded, final correct F1 can be restored based on F0 and Y0, the final (F0/F1/Y0) can then be obtained, and then final hash values of F0, F1, and Y0 can be aggregated to generate the second Merkle tree. The second Merkle tree may be denoted as <F0, F1, Y0>. When it is verified that the root node of the second Merkle tree <F0, F1, Y0> is D, the service data F can be restored based on F0, F1, and Y0.

In some embodiments, referring to FIG. 4, the node 0 is the first consensus node, the node 1 may send <F1, D1, D> to the node 0, and the node 2 may send <Y0, D3, D> to the node 0. Therefore, the node 0 can receive <F0, D0, D>, <F1, D1, D>, and <Y0, D3, D>, and verify each element in the obtained (F0/F1/Y0), for example, verify whether the hash value of each element in the calculated (F0/F1/Y0) and an obtained hash value of each element are valid (for example, whether the hash values are the same), and discard invalid (for example, the calculated hash value is different from the obtained hash value) data in (F0/F1/Y0). For example, when the node 0 receives <F1, D1, D> sent by the node 1, the node 0 can calculate to determine whether the hash value of F1 is the same as D1, if yes, maintain F1, and if not, discard F1. After one piece of data in (F0/F1/Y0) is discarded, correct data corresponding to the discarded data can be restored based on the maintained two other pieces of data. For example, if F1 is discarded, final correct F1 can be restored based on F0 and Y0, the final (F0/F1/Y0) can then be obtained, and then final hash values of F0, F1, and Y0 can be aggregated to generate the second Merkle tree. The second Merkle tree may be denoted as <F0, F1, Y0>. When it is verified that the root node of the second Merkle tree <F0, F1, Y0> is D, the service data F can be restored based on F0, F1, and Y0.

After restoring the service data of the service client, the first consensus node can package the restored service data, to obtain a service block including the service data.

Step S102: Obtain a second associated set, where the second associated set includes a plurality of pieces of block associated data, the plurality of pieces of block associated data includes a plurality of pieces of block shard data, and the plurality of pieces of block shard data are obtained by dividing the service block.

In step S102, the first consensus node divides the service block to obtain a plurality of pieces of block shard data, and the plurality of pieces of block shard data are block associated data in the second associated set.

In some embodiments, the first consensus node further obtains at least one piece of block redundant data based on the plurality of pieces of block shard data, and the block associated data in the second associated set further includes the at least one piece of block redundant data.

In some embodiments, when a network environment of the blockchain network is good, and the data sent by the service client to each consensus node in the blockchain network is less likely to be lost, the second associated set includes the plurality of pieces of block shard data, and may not include the at least one piece of block redundant data or may include the at least one piece of block redundant data.

In some embodiments, the number of pieces of block shard data in the second associated set is N, the number of pieces of block redundant data is M, and M and N are both positive integers. A process of obtaining the second associated set by the first consensus node is:

dividing the service block to obtain N pieces of block shard data of the service block, and obtaining M pieces of block redundant data of the service block according to the N pieces of block shard data, where the N pieces of block shard data and the M pieces of block redundant data jointly form the second associated set of the service block, the second associated set of the service block includes a total of M+N pieces of block associated data, and one piece of block associated data is one piece of block shard data or one piece of block redundant data.

In some embodiments, the service block includes a plurality of pieces of block field data, and each piece of block shard data includes a part of block field data in the service block. Assuming that the service block can also include Z pieces of block field data, where Z is a positive integer, dividing the service block by the first consensus node is dividing the Z pieces of block field data of the service block. A principle of dividing the service block by the first consensus node is the same as the above principle of dividing the service data by the service client.

For example, the principle of dividing the service block by the first consensus node can be: Since the first consensus node needs to send data to the K second consensus nodes, the second consensus node can divide the service block based on the number K of all second consensus nodes. Refer to the following descriptions.

First, the first consensus node can obtain the block redundant number M for the service block. The block redundant number M indicates a number of pieces of redundant data (redundant data can also be referred to as redundant code) of the service block that need to be generated by the first consensus node. The redundant data of the service block can be referred to as block redundant data. Therefore, the number of shards into which the first consensus node needs to divide the service block (which can be denoted as a block shard number N) can be K-M, that is, the sum of M and N is K.

The block redundant number M is a positive integer, and a specific value of M can be determined according to the actual application scenario. For example, the value of M can be preset by the developer, or can be determined according to a network stability level of the blockchain network. The more stable blockchain network indicates the smaller M, and the more unstable blockchain network indicates the larger M. For example, M can be equal to 1, 2, 3, or the like. When the blockchain network is relatively stable, M can be a small value such as 2. When the blockchain network is unstable, M can be a large value such as 5. However, generally, M is smaller than N.

The service block may include Z pieces of block field data, Z is a positive integer, and a specific value of Z is determined according to the actual application scenario. The first consensus node can divide, based on the block shard number N, the Z pieces of block field data included in the service block, and then obtain N pieces of shard data of the service block. The N pieces of shard data can be referred to as N pieces of block shard data, and one piece of block shard data may include one or more pieces of block field data.

Furthermore, the first consensus node can obtain M pieces of block redundant data of the service block based on the N pieces of block shard data obtained by data sharding/partition.

In some embodiments, a process of obtaining the M pieces of block redundant data is: The first consensus node obtains M redundant algorithms, and respectively performs calculation on the N pieces of block shard data according to the M different redundant algorithms, to obtain block redundant data corresponding to each redundant algorithm.

In some embodiments, any one of the M redundant algorithms may be any algorithm, for example, may be addition, multiplication, division, subtraction, or a combination of a plurality of algorithms. One redundant algorithm corresponds to one piece of block redundant data. It can be understood that a redundant algorithm is a process of associating the N pieces of block shard data. For example, a redundant algorithm can be addition. Then, values (such as binary values or decimal values) corresponding to the N pieces of block shard data can be added together, and a result of the addition can be used as block redundant data corresponding to the redundant algorithm. Redundant calculation data is calculated based on different redundant algorithms, to obtain different block redundant data.

Through the above process, the first consensus node obtains the N pieces of block shard data and the M pieces of block redundant data, and the set formed by the N pieces of block shard data and the M pieces of block redundant data can be referred to as the second associated set of the service block. The second associated set includes a total of N+M pieces of block associated data, and one piece of block associated data is one piece of block shard data or one piece of block redundant data.

In some embodiments, a process of obtaining the block redundant number M by the first consensus node can also be: The first consensus node can obtain the network stability level of the blockchain network. The network stability level can be evaluated by the blockchain network according to some strategies. The network stability level of the blockchain network can be referred to as the target stability level. A redundant number mapping table is obtained, and the redundant number mapping table may be preset by the developer. The redundant number mapping table may include a mapping relationship between at least two network stability levels and corresponding redundant numbers, and the at least two network stability levels may include the target stability level. Therefore, the first consensus node can use a redundant number that has a mapping relationship with the target stability level in the redundant number mapping table as the block redundant number M.

In addition, similarly in some embodiments, N usually needs to be greater than M. When the number of pieces of field data included in the service block is excessively small and the number of the second consensus nodes is excessively large, N+M may not be K. In this case, different second consensus nodes can obtain the same block associated data sent by the first consensus node. Refer to the following descriptions.

Step S103: Send a part of block associated data in the second associated set to each of K second consensus nodes, so that the second consensus nodes broadcast, to each other, block associated data received by each other and restore the service block.

In some embodiments, the first consensus node can send each piece of block associated data in the second associated set to the K second consensus nodes, and one second consensus node can receive one piece of block associated data sent by the first consensus node. The block associated data received by different second consensus nodes is usually different (for example, when N+M is K). However, when N+M is less than K, the block associated data received by different second consensus nodes can be the same.

Similarly, the K second consensus nodes can broadcast the block associated data received by the K second consensus nodes to each other, so that as long as each second consensus node receives N or more pieces of different block associated data, the second consensus node restores the service block based on the received block associated data. A principle of restoring the service block based on the N pieces of block associated data by each second consensus node is the same as that of restoring the service data based on the W pieces of service associated data by the first consensus node. This can be understood as using a piece of block shard data as an unknown quantity and using a piece of block associated data as an equation, and restoring the N pieces of block shard data (that is, N unknown quantities) based on the N pieces of block associated data (that is, N equations).

Figure 5:
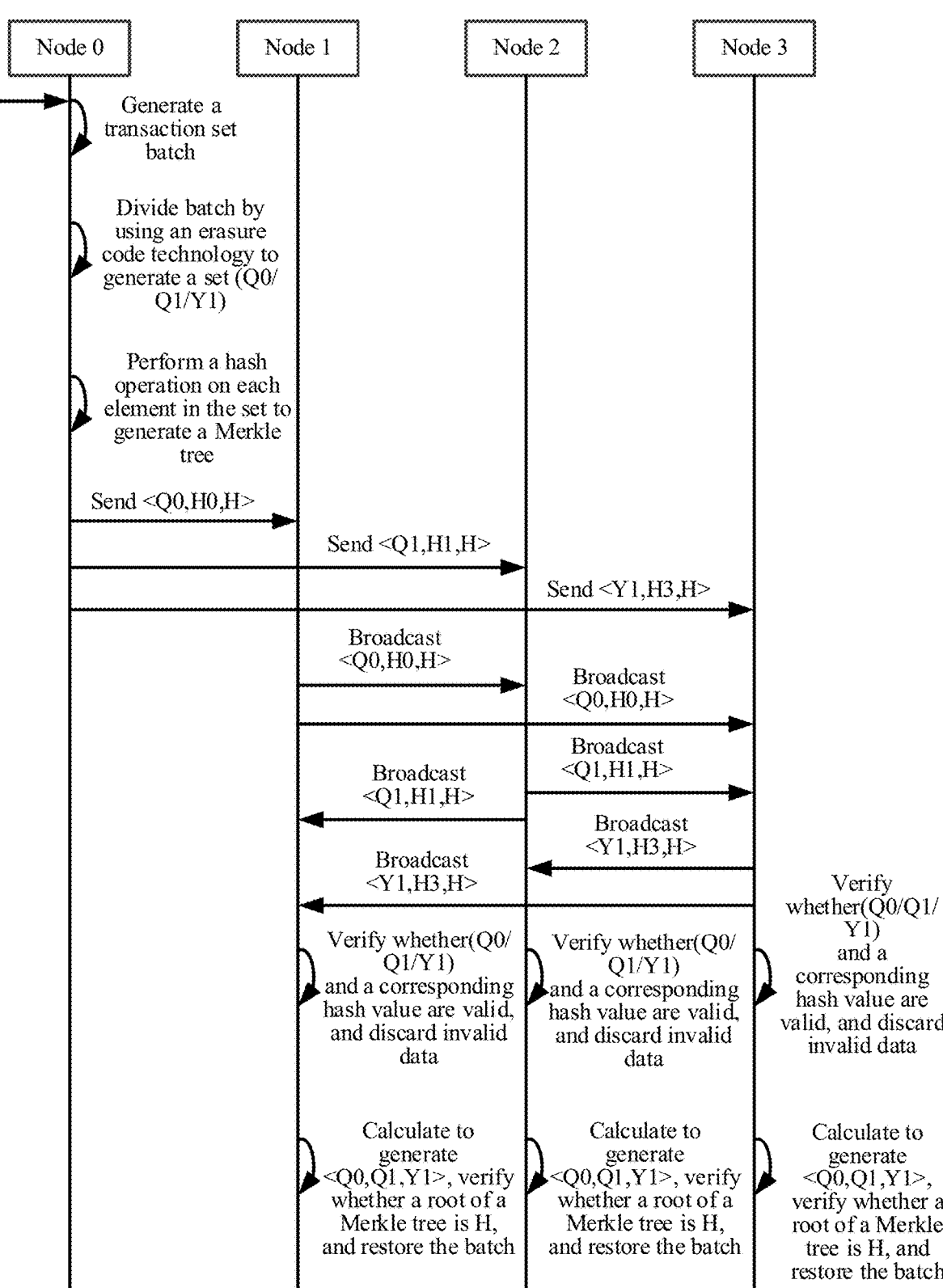
FIG. 5 is a schematic flowchart of returning a service block by a consensus node according to the present disclosure.

FIG. 5 is a schematic flowchart of returning a service block by a consensus node according to the present disclosure. As shown in FIG. 5, a node 0 may be the first consensus node (that is, a leader node), and a node 1, a node 2, and a node 3 are all second consensus nodes. First, the node 0 can generate a transaction set batch, and the transaction set batch can be understood as a service block that packages several pieces of service data, that is, the batch herein can refer to the above service block. The node 0 can divide the batch by using the erasure code technology to obtain a set (Q0/Q1/Y1). Q0 and Q1 are two pieces of block shard data obtained by dividing the service block, and Y1 is one piece of block redundant data that is of the service block and that is obtained based on Q0 and Q1. The node 0 can also calculate the hash value of each element (including an element Q0, an element Q1, and an element Y1) in the set (Q0/Q1/Y1), and generate a fifth Merkle tree (that is, a Merkle tree structure) based on a hash value of each element.

Therefore, the node 0 can send <Q0, H0, H> to the node 1, and <Q0, H0, H> includes the block shard data Q0, a hash value H0 of the block shard data Q0, and a root node H of the fifth Merkle tree. The node 0 can send <Q1, H1, H> to the node 2, and <Q1, H1, H> includes the block shard data Q1, a hash value H1 of the block shard data Q1, and the root node H of the fifth Merkle tree. The node 0 can send <Y1, H3, H> to the node 3, and <Y1, H3, H> includes the block redundant data Y1, a hash value H3 of the block redundant data Y1, and the root node H of the fifth Merkle tree.

Therefore, the node 1 can broadcast <Q0, H0, H> to the node 2 and the node 3, the node 2 can broadcast <Q1, H1, H> to the node 1 and the node 3, and the node 3 can broadcast <Y1, H3, H> to the node 1 and the node 2. Therefore, the node 1, the node 2, and the node 3 can verify each element in (Q0/Q1/Y1) obtained by the node 1, the node 2, and the node 3, for example, verify whether the hash value of each element in the calculated (Q0/Q1/Y1) and an obtained hash value of each element are valid (for example, whether the hash values are the same), and discard invalid (for example, the calculated hash value is different from the obtained hash value) data in (Q0/Q1/Y1). After one piece of data is discarded, correct data corresponding to the discarded data can be restored based on the maintained two other pieces of data. Then, a hash value of Q0, a hash value of Q1, and a hash value of Y1 that are finally obtained can be aggregated to generate a sixth Merkle tree based on the hash value of Q0, the hash value of Q1, and the hash value of Y1. The sixth Merkle tree may be denoted as <Q0, Q1, Y1>. When it is verified that the root node of the sixth Merkle tree <Q0, Q1, Y1> is H, the service block batch can be restored based on Q0, Q1, and Y1.

Step S104: Reach consensus on the service block between the first consensus node and the K second consensus nodes.

In some embodiments, after each second consensus node restores the service block, the first consensus node and each second consensus node jointly reach consensus on the service block, where the first consensus node and the second consensus node may reach consensus on the service block based on a Byzantine Fault Tolerance (BFT) consensus algorithm. As long as more than a specific number of consensus nodes (for example, 2/3 consensus nodes) reach consensus that the service block is valid, it is considered that consensus on the service block is reached. Therefore, even if a small number of second consensus nodes fail to restore the service block and consequently cannot reach consensus on the service block, this does not affect the consensus result of the first consensus node and all second consensus nodes that can reach consensus on the service block.

Therefore, the first consensus node can reach consensus on the service block between the first consensus node and the K second consensus nodes (allowing a case in which a small number of second consensus nodes fail to reach consensus on the service block when failing to restore the service block), and after the first consensus node detects that the consensus on the service block is reached, the first consensus node can generate reply data for the service data. The reply data can be confirmation information for the service data. For example, the confirmation information can be information for confirming completion of a service transaction indicated by the service data or information for confirming successful cochaining of the service data.

In fact, after detecting that consensus on the service block is reached, each consensus node (including the first consensus node and each second consensus node) generates reply data for the service data. Under normal circumstances, each consensus node generates the same reply data, and each consensus node can send the reply data to the service client, or send one piece of reply associated data to the service client. The reply associated data is one of a plurality of pieces of reply shard data, or one of at least one piece of reply redundant data, the plurality of pieces of reply shard data are obtained by dividing the reply data, and the at least one piece of reply redundant data is calculated based on the plurality of pieces of reply shard data.

When sending one piece of reply associated data to the service client, each consensus node can divide the reply data to obtain a plurality of pieces of reply shard data of the reply data, and can generate at least one piece of reply redundant data of the reply data based on the plurality of pieces of reply shard data. Manners of dividing, by each consensus node, the reply data generated by the consensus node and manners of calculating the reply redundant data based on the reply shard data are the same. The reply shard data and the reply redundant data are both referred to as reply associated data. The number of pieces of reply associated data obtained by a consensus node can be equal to a total number of all consensus nodes (such as K+1), and a specific piece of reply associated data that needs to be returned by each consensus node to the service client can be agreed on. Therefore, each consensus node can determine a piece of reply associated data that needs to be returned to the service client and that is of the plurality of pieces of reply associated data obtained by the consensus node, and return the reply associated data to the service client.

A principle of dividing the reply data by each consensus node may be the same as the principle of dividing the service data by the service client.

The reply associated data returned by the first consensus node to the service client may be referred to as the first reply associated data, and the reply associated data returned by the second consensus node to the service client may be referred to as the second reply associated data.

Principles of returning the reply associated data of the reply data to the service blockchain by consensus nodes are the same. Therefore, a process of returning the first reply associated data to the service client by the first consensus node is used as an example for illustration. Refer to the following descriptions.

After the first consensus node reaches consensus on the service block and generates the reply data of the service data, the first consensus node can divide the reply data to obtain H pieces of reply shard data of the reply data. The first consensus node can also calculate reply redundant data of the reply data based on the H pieces of reply shard data. The number of pieces of reply redundant data can be S. Both S and H are positive integers. The values of S and H can be determined according to actual application scenarios. The sum of S and H can be equal to the total number K+1 of consensus nodes, that is, the first consensus node obtains S+H pieces of reply associated data. Therefore, the first consensus node can select one of the S+H pieces of reply associated data as the first reply associated data, and the first reply associated data can be pre-agreed data that is of the S+H pieces of reply associated data and that needs to be returned by the first consensus node to the service client.

The service client receives the reply associated data returned by each consensus node. After receiving H pieces of different reply associated data, the service client can restore the reply data for the service data based on the H pieces of different reply associated data.

Figure 6:
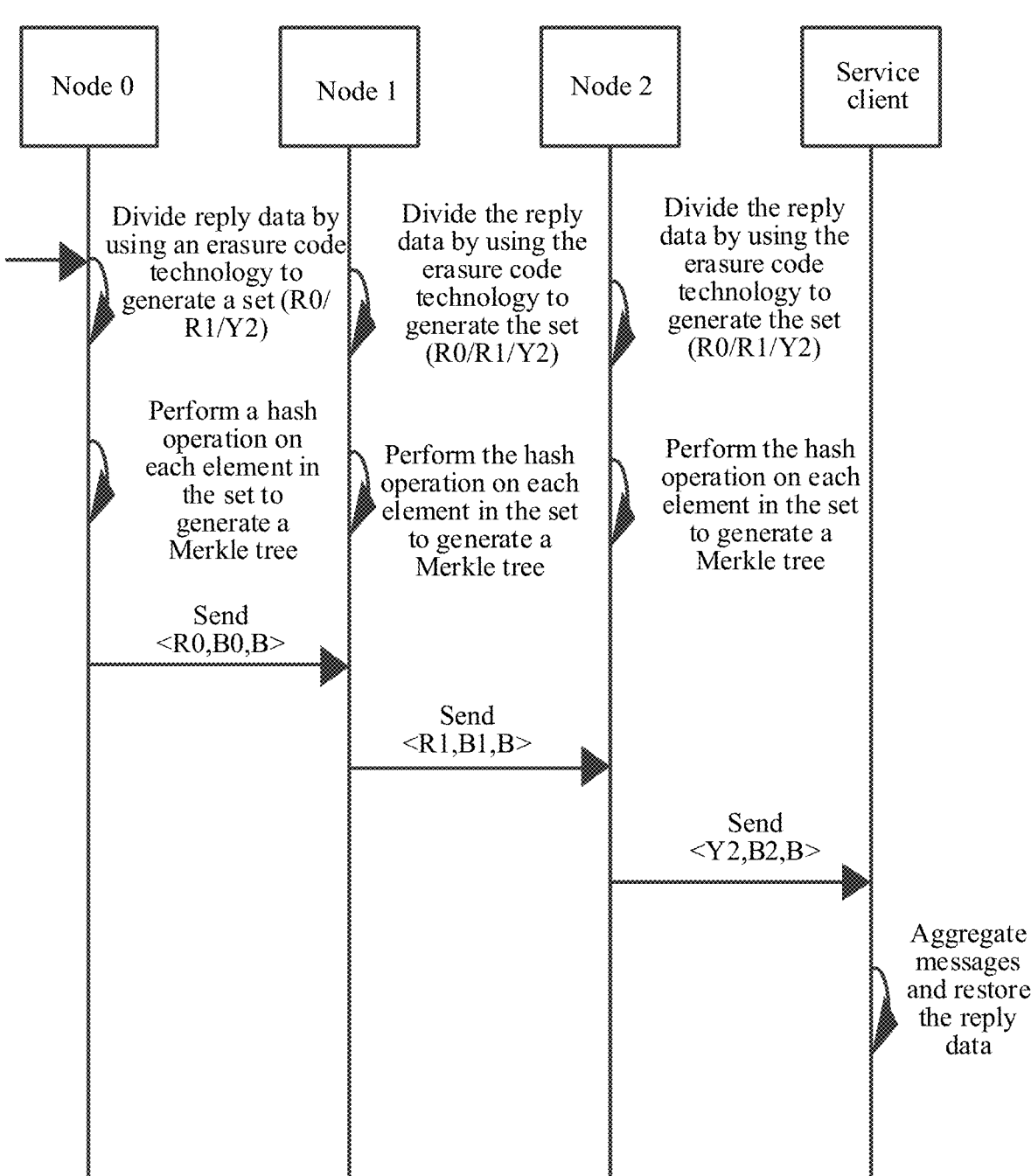
FIG. 6 is a schematic flowchart of obtaining reply data by a service client according to the present disclosure.

FIG. 6 is a schematic flowchart of obtaining reply data by a service client according to the present disclosure. As shown in FIG. 6, the consensus nodes in the blockchain network include a node 0, a node 1, and a node 2. In this case, the node 0, the node 1, and the node 2 can all generate reply data for the service data after detecting that consensus on the service block is reached. The reply data for the service data generated by the node 0, the node 1, and the node 2 is the same. The node 0, the node 1, and the node 2 can all divide, by using the erasure code technology, the reply data generated by the node 0, the node 1, and the node 2, to obtain the same set (R0/R1/Y2). The set includes reply shard data R0 and reply shard data R1 obtained by dividing the reply data, and the set also includes reply redundant data Y2 that is of the reply data and that is obtained based on the reply shard data R0 and the reply shard data R1.

Each consensus node can calculate a hash value of each element (including an element R0, an element R1, and an element Y2) in the set (R0/R1/Y2), and construct the third Merkle tree based on the hash value of each element, where a root node of the third Merkle tree can be denoted as B.

Therefore, the node 0 can send <R0, B0, B> to the service client, <R0, B0, B> includes reply shard data R0, a hash value B0 of the reply shard data R0, and a root node B of the third Merkle tree. The node 1 can send <R1, B1, B> to the service client, <R1, B1, B> includes reply shard data R1, a hash value B1 of the reply shard data R1, and the root node B of the third Merkle tree. The node 2 can send <Y2, B2, B> to the service client, <Y2, B2, B> includes reply redundant data Y2, a hash value B2 of the reply redundant data Y2, and the root node B of the third Merkle tree.

After obtaining <R0, B0, B>, <R1, B1, B>, and <Y2, B2, B>, the service client can reconstruct a fourth Merkle tree based on the hash value of R0, the hash value of R1, and the hash value of Y2. After verifying that the root node of the fourth Merkle tree is equal to B, the service client can restore the reply data based on R0, R1, and Y2.

Figure 7:
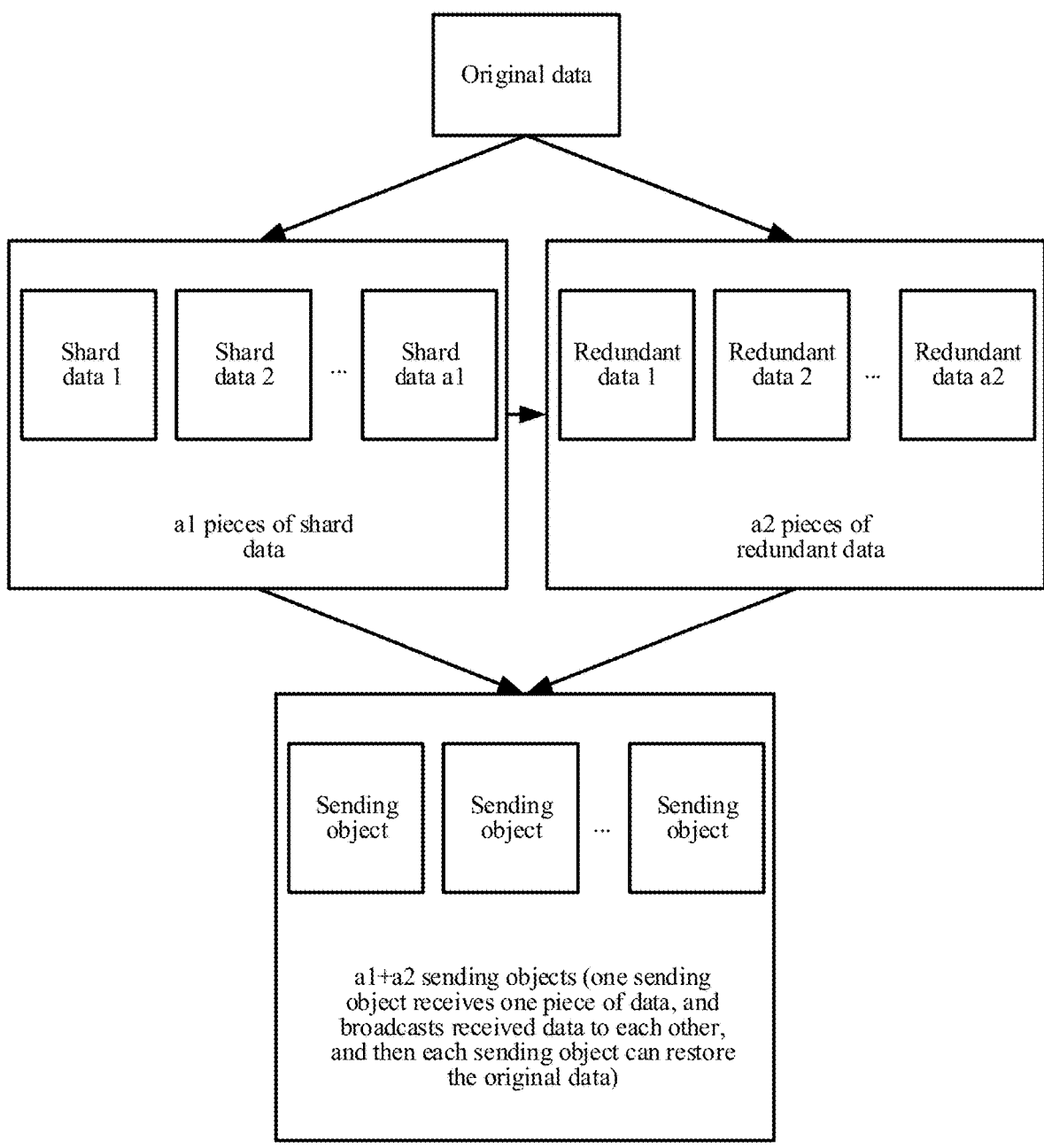
FIG. 7 is a schematic diagram of a data partitioning scenario according to the present disclosure.

FIG. 7 is a schematic diagram of a data partitioning scenario according to the present disclosure. The original data herein may refer to the service data or the service block. The original data can be divided to obtain a1 pieces of shard data (including shard data 1 to shard data a1), and a2 pieces of redundant data (including redundant data 1 to redundant data a2) of the original data can be obtained based on the a1 pieces of shard data. Therefore, there can be a total of a1+a2 sending objects, and then the a1 pieces of shard data and the a2 pieces of redundant data can be sent to the a1+a2 sending objects respectively. One sending object can obtain one piece of shard data or one piece of redundant data, and different sending objects can obtain different pieces of shard data or redundant data. Furthermore, each sending object can broadcast the shard data or the redundant data obtained by the sending object, so that each sending object can restore the original data.

If the original data is service data, the a1 pieces of shard data can be the W pieces of service shard data of the service data, the a2 pieces of redundant data can be the G pieces of service redundant data of the service data, and the a1+a2 sending objects can be all the consensus nodes.

If the original data is a service block, the a1 pieces of shard data can be the N pieces of block shard data of the service block, the a2 pieces of redundant data can be the M pieces of block redundant data of the service block, and the a1+a2 sending objects can be all the second consensus nodes.

Figure 8:
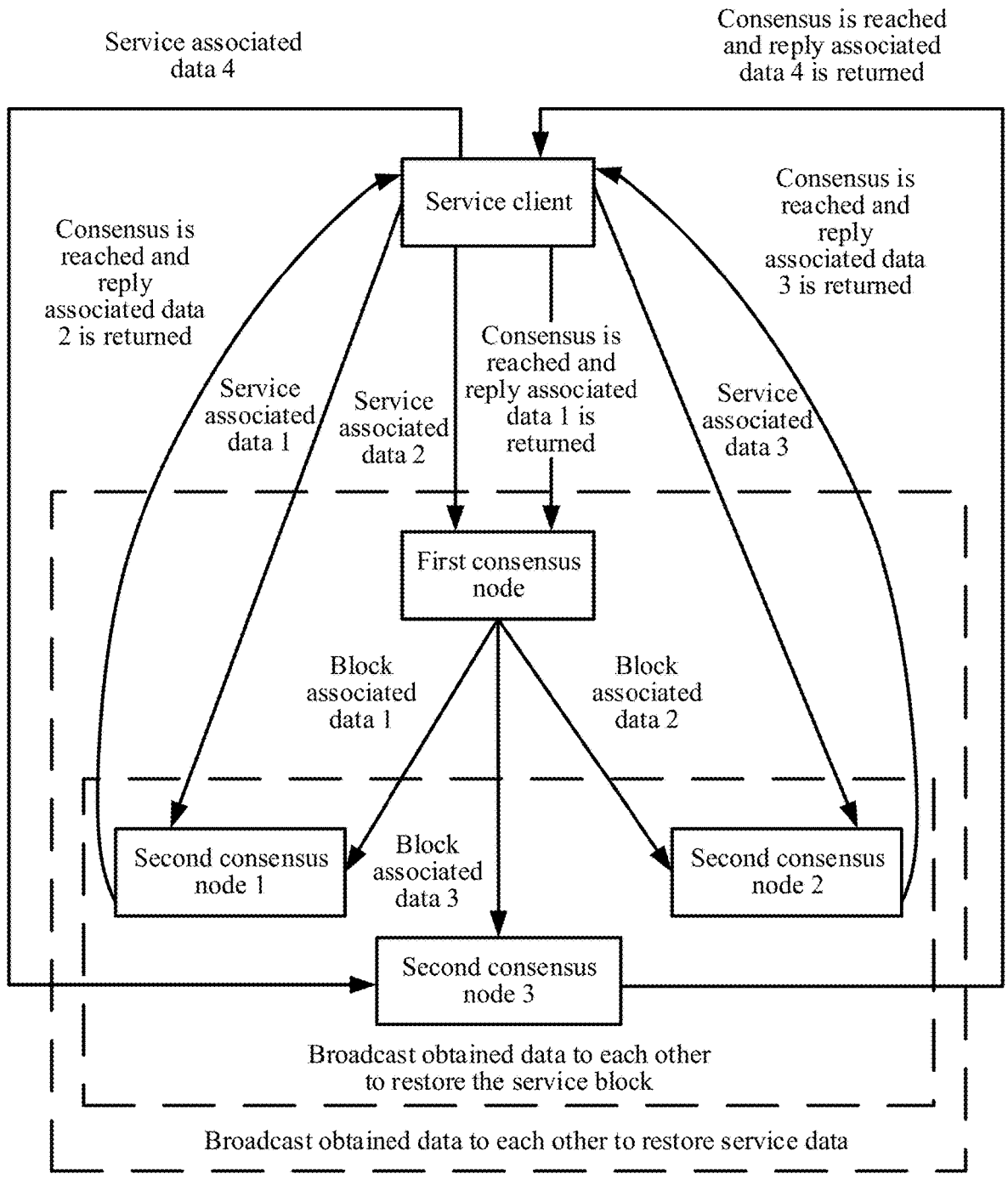
FIG. 8 is a schematic diagram of a data consensus scenario according to the present disclosure.

FIG. 8 is a schematic diagram of a data consensus scenario according to the present disclosure. As shown in FIG. 7, the consensus nodes in the blockchain network may include a first consensus node, a second consensus node 1, a second consensus node 2, and a second consensus node 3. The first associated set of service data of the service client may include service associated data 1, service associated data 2, service associated data 3, and service associated data 4. The service client can send service associated data 1 to the second consensus node 1, send service associated data 2 to the first consensus node, send service associated data 3 to the second consensus node 2, and send service associated data 4 to the second consensus node 3. Furthermore, each second consensus node sends the service associated data received by the second consensus node to the first consensus node. Therefore, the first consensus node can restore the service data by receiving a plurality of pieces of service associated data, and can package the service data as a service block.

The first consensus node may obtain the second associated set of the service block, and the second associated set may include block associated data 1, block associated data 2, and block associated data 3. The first consensus node can send the block associated data 1 to the second consensus node 1, the block associated data 2 to the second consensus node 2, and the block associated data 3 to the second consensus node 3. Furthermore, the second consensus nodes broadcast, to each other, the block associated data obtained by each other, so that each second consensus node can restore the service block.

After each second consensus node restores the service block, the first consensus node and each second consensus node can jointly reach consensus on the service block. After detecting that consensus on the service block is reached, each consensus node can return corresponding reply associated data to the service client. The first consensus node can return reply associated data 1 to the service client, the second consensus node 1 can return reply associated data 2 to the service client, the second consensus node 2 can return the reply associated data 3 to the service client, and the second consensus node 3 can return the reply associated data 4 to the service client. Furthermore, the service client can restore the reply data for the service data according to the obtained reply associated data 1, reply associated data 2, reply associated data 3, and reply associated data 4.

Figure 9:
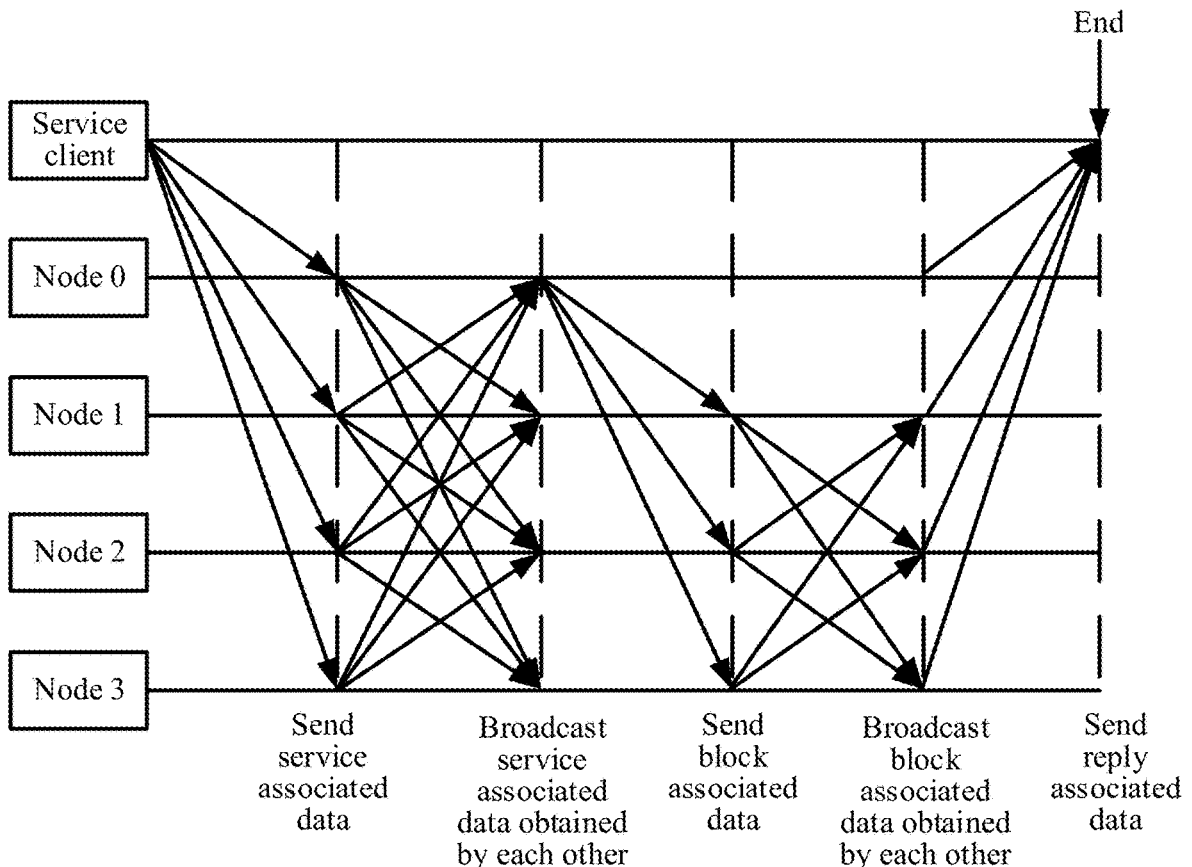
FIG. 9 is a schematic diagram of a data sending scenario according to the present disclosure.
Figure 10:
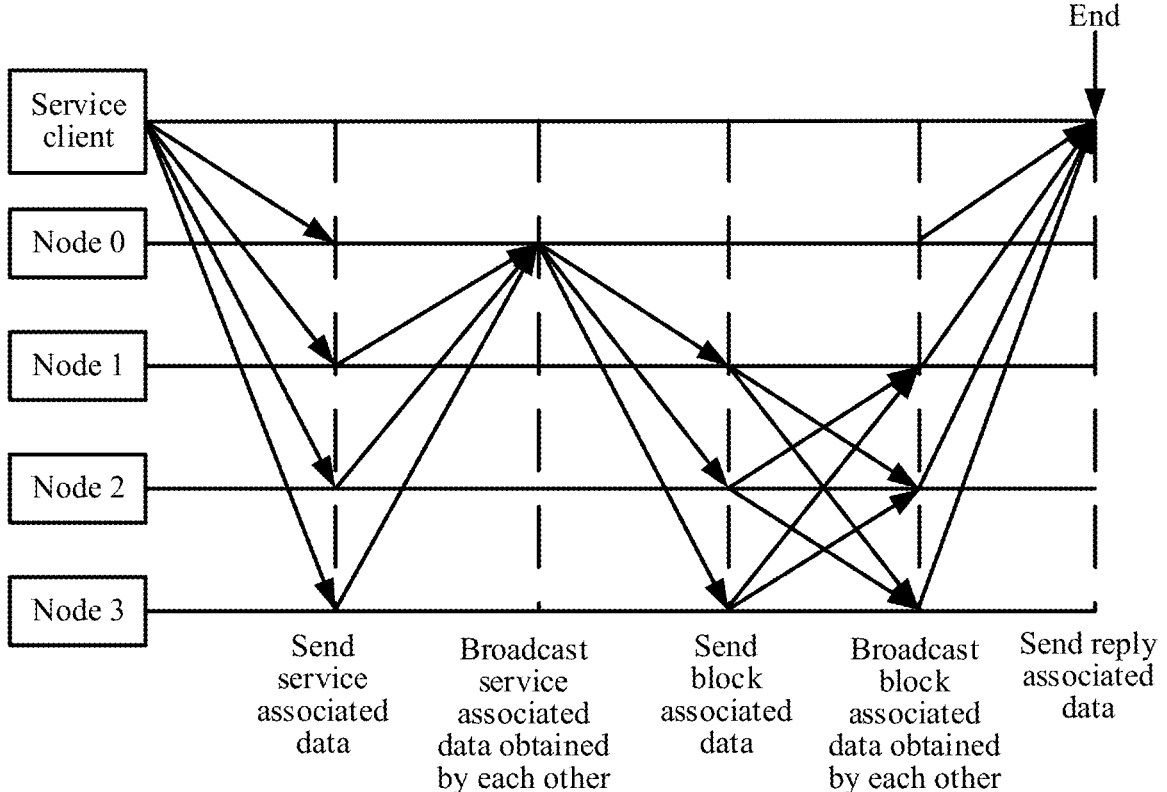
FIG. 10 is a schematic diagram of another data sending scenario according to the present disclosure.
Figure 11:
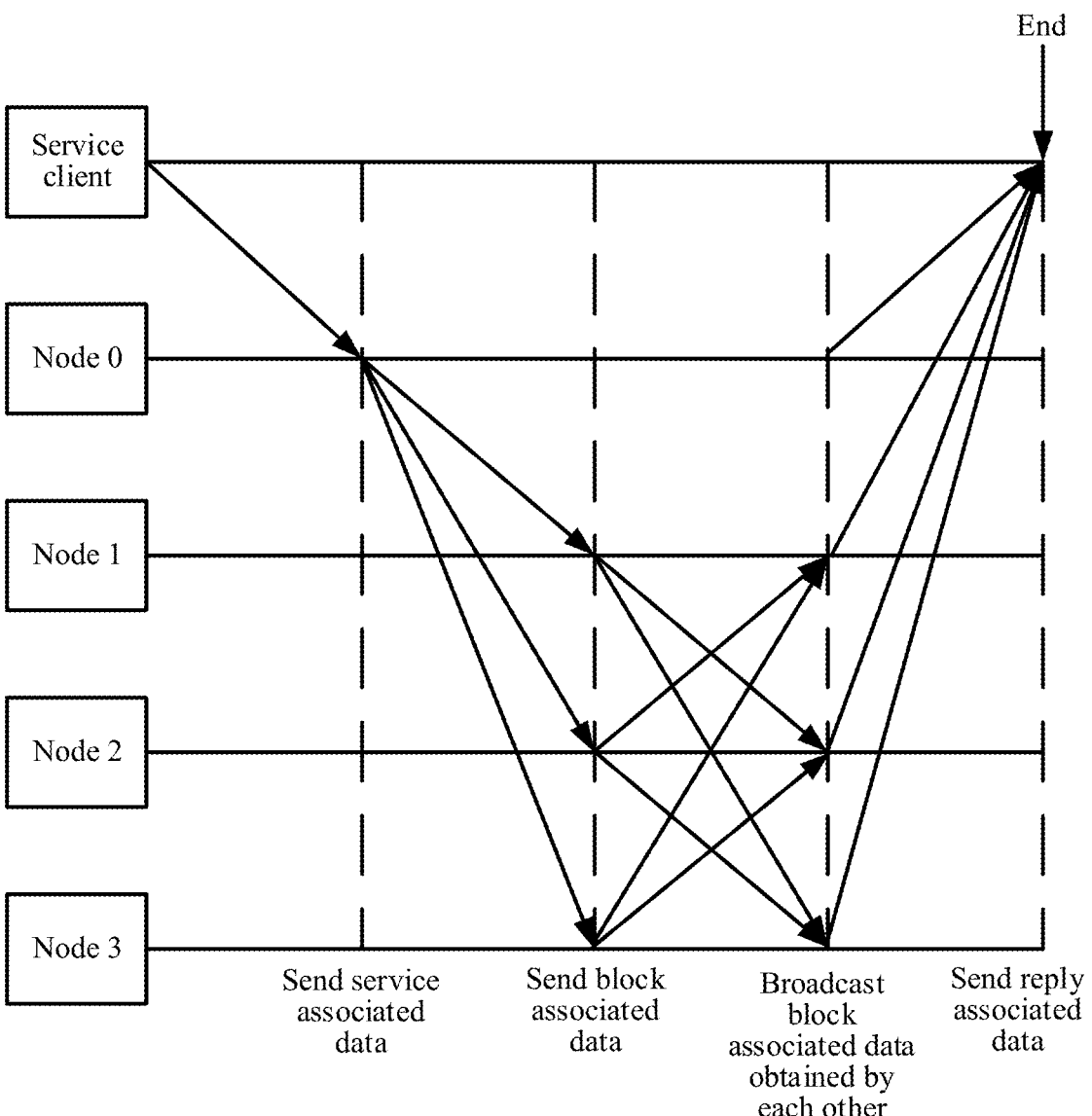
FIG. 11 is a schematic diagram of another data sending scenario according to the present disclosure.

FIG. 9, FIG. 10, and FIG. 11 are schematic diagrams of data sending scenarios according to the present disclosure. As shown in FIG. 9, FIG. 10, and FIG. 11, in the present disclosure, the consensus nodes in the blockchain network may include a node 0, a node 1, a node 2, and a node 3, and an arrow in FIG. 9, FIG. 10, and FIG. 11 can indicate that there is data transmission. The node 0 may be the first consensus node, and the node 1, the node 2, and the node 3 may all be the second consensus nodes.

In some embodiments, referring to FIG. 9, the service client can send service associated data of service data to the node 0, the node 1, the node 2, and the node 3 respectively, so that the node 0, the node 1, the node 2, and the node 3 broadcast, to each other, service associated data obtained by each other, and the node 0 restores the service data based on the received plurality of pieces of service associated data.

In some embodiments, referring to FIG. 10, the service client can send service associated data of service data to the node 0, the node 1, the node 2, and the node 3 respectively, so that the node 1, the node 2, and the node 3 all broadcast, to the node 0, service associated data obtained by the node 1, the node 2, and the node 3, and the node 0 restores the service data based on the received plurality of pieces of service associated data.

In some embodiments, referring to FIG. 11, the service client sends service data to the node 0, and the node 0 receives the service data.

The node 0 can package the obtained service data into a service block, and then the node 0 can send the block associated data of the service block to the node 1, the node 2, and the node 3 respectively, so that the node 1, the node 2, and the node 3 can restore the service block after broadcasting, to each other, the block associated data obtained by each other.

Furthermore, the node 0, the node 1, the node 2, and the node 3 can jointly reach consensus on the service block, after detecting that consensus on the service block is reached, the node 0, the node 1, the node 2, and the node 3 can respectively send the reply associated data to the service client, and then the service client can obtain the reply data for the service data based on the reply associated data sent by the node 0, the node 1, the node 2, and the node 3 respectively.

On the basis of FIG. 9, FIG. 12 is a schematic diagram of a data sending scenario in a related technology according to the present disclosure. As shown in FIG. 12, in related technologies, an example in which consensus nodes in a blockchain network include a node 0, a node 1, a node 2, and a node 3 is also used as an example for illustration. An arrow in FIG. 12 can also indicate that there is data transmission. Similarly, the node 0 may be the first consensus node, and the node 1, the node 2, and the node 3 may all be the second consensus nodes. Specifically, the service client can send the full amount of service data to the node 0, the node 1, the node 2, and the node 3 respectively, then the node 0 can package the obtained service data sent by the service client to obtain the service block, the node 0 can send the full amount of service block to the node 1, the node 2, and the node 3 respectively, then the node 0, the node 1, the node 2, and the node 3 can jointly reach consensus on the service block, after consensus on the service blocks is reached, the node 0, the node 1, the node 2, and the node 3 can all generate reply data for the service data, and the node 0, the node 1, the node 2, and the node 3 can all send the full amount of reply data to the service client.

As can be seen by comparing FIG. 9, FIG. 10, FIG. 11, and FIG. 12, compared with the related technology, in the present disclosure, during transmission of service data, the service associated data of the service data is sent to different consensus nodes, or service data is sent to the first consensus node. However, in the related technology, the full amount of service data is directly sent to each consensus node. Therefore, compared with the related technology, in the present disclosure, the data transmission volume of the service client can be greatly reduced during transmission of the service data, or as shown in FIG. 10 and FIG. 11, the amount of data received by each second consensus node can be greatly reduced, thereby improving the communication speed between the service client and each consensus node and reducing traffic expansion in the blockchain network. In addition, in the present disclosure, during transmission of the service block and the reply data, the first consensus node sends the block associated data of the service block to each second consensus node, and each consensus node sends the reply associated data of the reply data. However, in the related technology, the first consensus node directly sends the full amount of service block to each second consensus node and each consensus node sends the full amount of reply data. Therefore, compared with the related technology, in the present disclosure, the amount of data sent by the first consensus node can be greatly reduced during transmission of the service block, and the amount of data sent by each consensus node can also be greatly reduced during transmission of reply data, thereby improving the communication speed between the service client and the consensus node or the communication speed between different consensus nodes, reducing traffic expansion in the blockchain network, and improving the communication quality of the consensus nodes in the blockchain network.

In the method provided in the present disclosure, at the stage when the service client sends service data to the blockchain network (which can be referred to as the request stage), the service client can send the service associated data of the service data to each consensus node (the first consensus node and K second consensus nodes) in the blockchain network. Then, each second consensus node sends the service associated data obtained by the second consensus node to the first consensus node, and the first consensus node restores the service data based on each piece of received service associated data, so that the service client does not need to send the complete service data to each consensus node in the blockchain network. This reduces the traffic that the service client brings to the consensus node, and the communication complexity O(X*J) of transmission of the complete service data is reduced to the communication complexity O(X) of transmission of the service associated data. X represents a volume of the service data (for example, the number of pieces of service field data), and J represents the total number of nodes, such as K+1. Besides, this improves the communication speed between the service client and the consensus node, thereby reducing the memory pressure of each consensus node in obtaining the service data and avoiding traffic expansion when the number of consensus nodes is large. Moreover, when the communication quality between a consensus node and the service client is poor and the service associated data sent by the service client is not received, the consensus node can also restore the service data based on the service associated data sent by other consensus nodes (for example, W or more pieces of obtained service associated data), so that the consensus node can also restore a client request normally and process subsequent logic.

At the stage when the first consensus node broadcasts the packaged service block (which can be referred to as a pre-prepare stage), the first consensus node can broadcast (that is, send) the block associated data of the service block to each second consensus node, and then each second consensus node can broadcast, to each other, the block associated data obtained by each other, to restore the service block. Since the data volume of the service block is usually very large at this stage, the complete service block is not broadcast to each second consensus node, and instead the service associated data of the service block is broadcast to each second consensus node, which can better reduce the communication complexity of the service block at this stage and improve the communication performance of the entire blockchain network (for example, improve the communication stability and the communication speed of the blockchain network). At this stage, even if the communication between a second consensus node and the first consensus node has a problem and consequently the second consensus node cannot receive the block associated data sent by the first consensus node, the second consensus node can restore the service block based on the block associated data broadcast by other second consensus nodes, and normally perform the consensus process on the service block, that is, the second consensus node with a communication problem with the first consensus node can reach consensus on the service block, which further improves the stability of the consensus process in the blockchain network.

At the stage when the consensus node replies to the service client (which can be referred to as a response stage), each consensus node only needs to return the reply associated data of the reply data to the service client, instead of returning the full amount of reply data, which also reduces the communication complexity between the consensus node and the service client at this stage, reduces the data communication volume between each consensus node and the service client, improves the communication speed, and reduces the memory pressure of the service client.

In the present disclosure, the first consensus node can generate the service block to which the service data belongs; divide the service block to obtain N pieces of block shard data of the service block, and obtain M pieces of block redundant data of the service block according to the N pieces of block shard data; where the N pieces of block shard data and the M pieces of block redundant data jointly form the second associated set of the service block, the second associated set of the service block includes a total of M+N pieces of block associated data, one piece of block associated data is one piece of block shard data or one piece of block redundant data, and M and N are both positive integers; send each piece of block associated data in the second associated set of the service block to K consensus nodes respectively; where all the second consensus nodes receive block associated data and the K second consensus nodes broadcast, to each other, block associated data respectively received by each other, so that each second consensus node restores the service block; and reach consensus on the service block between the first consensus node and the K second consensus nodes. As can be seen, in the method provided by the present disclosure, the first consensus node can send the block associated data of the service block to each second consensus node, instead of sending the complete service block to each second consensus node, and each second consensus node can also restore the service block and then reach consensus on the service block. Consensus on the service block can be understood as consensus on the service data. Therefore, this can reduce a volume of data communication in the consensus process of service data, and reduce complexity of communication, thereby improving stability and efficiency of service data consensus in the blockchain network.

FIG. 13 is a schematic flowchart of a consensus processing method for a blockchain network according to the present disclosure. The embodiment described in FIG. 13 is actually the same embodiment as the embodiment described in FIG. 2 above, except that the execution entity in the embodiment described in FIG. 2 is the first consensus node, and the execution entity of the embodiment described in FIG. 13 is the service client. Therefore, the content described in FIG. 2 can be combined with the content described in FIG. 13. As shown in FIG. 13, the method may include:

Step S201: Obtain a first associated set, where the first associated set includes a plurality of pieces of service associated data, the plurality of pieces of service associated data include a plurality of pieces of service shard data, and the plurality of pieces of service shard data are obtained by dividing service data.

In some embodiments, redundant calculation is performed on the plurality of pieces of service shard data to obtain at least one piece of service redundant data. The plurality of pieces of service associated data also include the at least one piece of service redundant data.

W represents the number of pieces of service shard data in the first associated set, G represents the number of pieces of service redundant data in the first associated set, and both W and G are positive integers. In step S201, the service data is divided to obtain W pieces of service shard data of the service data, and G pieces of service redundant data of the service data are obtained according to the W pieces of service shard data. The W pieces of service shard data and the G pieces of service redundant data jointly form the first associated set of the service data, the first associated set includes a total of W+G pieces of service associated data, and a piece of service associated data is a piece of service shard data or a piece of service redundant data.

In some embodiments, the service client can be carried in the terminal device, and the service client can be any application client or webpage client or the like.

For a specific process of obtaining the first associated set by the service client, refer to the relevant descriptions in step S101 in the embodiment corresponding to FIG. 2, and details are not repeated herein.

Step S202: Send a part of service associated data in the first associated set to each consensus node in the blockchain network, where each consensus node includes a first consensus node and a plurality of second consensus nodes, so that each second consensus node sends service associated data respectively received by the second consensus node to the first consensus node, and the first consensus node restores the service data based on the received service associated data and performs consensus processing on the service data.

Each piece of service associated data in the first associated set is sent to the consensus node in the blockchain network. Each consensus node receives one piece of service associated data, and each second consensus node sends the service associated data received by the second consensus node to the first consensus node, so that the first consensus node restores the service data and performs consensus processing on the service data.

In some embodiments, the service client can send service associated data in the first associated set to the consensus nodes (including the first consensus node and K second consensus nodes) in the blockchain network respectively. One consensus node can obtain one piece of service associated data, and each consensus node can broadcast, to each other, the service associated data obtained by each other, or each second consensus node can send the service associated data obtained by the second consensus node to the first consensus node. Therefore, the first consensus node can obtain the service associated data sent by each second consensus node, and then the first consensus node can restore the service data based on the service associated data sent by each second consensus node and the service associated data obtained by the first consensus node, and then can perform consensus processing on the restored service data. Herein, the process of performing consensus processing on the restored service data by the first consensus node may be a process of packaging the service data into the service block as described in the embodiment corresponding to FIG. 2, and then jointly reaching consensus on the service block by the first consensus node and the K second consensus nodes.

In some embodiments, reaching consensus on the service block by the first consensus node can indicate that the first consensus node reaches consensus on the service data. After the first consensus node reaches consensus on the service data, the first consensus node can return the first reply associated data to the service client. Similarly, reaching consensus on the service block by the second consensus node also indicates that the second consensus node reaches consensus on the service data. After the second consensus node reaches consensus on the service data, the second consensus node can also return the second reply associated data to the service client. For specific descriptions of the first reply associated data and the second reply associated data, refer to the descriptions in the embodiment corresponding to FIG. 2.

Therefore, the service client can obtain the first reply associated data returned by the first consensus node and the second reply associated data returned by each second consensus node.

In some embodiments, the service client can restore the reply data for the service data based on the obtained first reply associated data and the second reply associated data returned by each second consensus node.

When obtaining the first reply associated data returned by the first consensus node, the service client can also obtain the root node of the third Merkle tree sent by the first consensus node. The third Merkle tree can be a Merkle tree constructed by the first consensus node based on each piece of reply associated data of the reply data obtained by the first consensus node.

Therefore, the service client can also construct the fourth Merkle tree again based on the first reply associated data and all the second reply associated data. It can be compared whether the root node of the fourth Merkle tree is the same as the root node of the third Merkle tree. If yes, it can be considered that the first reply associated data and the second reply associated data are credible, and the reply data for the service data can be restored based on the first reply associated data and the second reply associated data.

In some embodiments, when returning the second reply associated data to the service client, each second consensus node may also send the root node of the third Merkle tree to the service client, and the root node of the third Merkle tree returned by the second consensus node to the service client may be that of a Merkle tree constructed by the second consensus node based on each piece of reply associated data of the reply data obtained by the second consensus node.

Therefore, the service client can also compare whether the root node of the third Merkle tree sent by each consensus node is the same as the root node of the fourth Merkle tree. If the root nodes are all the same, or a root node of a third Merkle tree sent by a consensus node of H pieces of reply associated data is the same as the root node of the fourth Merkle tree, it can be considered that the obtained first reply data and second reply data are credible, and the reply data for the service data can be restored based on the first reply data and the second reply data.

Generally, due to the restoration mechanism, the corresponding complete data can be restored based on the shard data and redundant data, and then the shard data and redundant data are usually accurate. If the shard data and redundant data are inaccurate, the corresponding complete data cannot be restored. The shard data herein may be the service shard data, the block shard data, or the reply shard data, the redundant data herein may be the service redundant data, the block redundant data, or the reply redundant data, and the complete data herein may be the service data, the service block, or the reply data.

In the present disclosure, the first consensus node can generate the service block to which the service data belongs; divide the service block to obtain N pieces of block shard data of the service block, and obtain M pieces of block redundant data of the service block according to the N pieces of block shard data; where the N pieces of block shard data and the M pieces of block redundant data jointly form the second associated set of the service block, the second associated set of the service block includes a total of M+N pieces of block associated data, one piece of block associated data is one piece of block shard data or one piece of block redundant data, and M and N are both positive integers; send each piece of block associated data in the second associated set of the service block to K second consensus nodes respectively; where all the second consensus nodes receive block associated data and the K second consensus nodes broadcast, to each other, block associated data respectively received by each other, so that each second consensus node restores the service block; and reach consensus on the service block between the first consensus node and the K second consensus nodes. As can be seen, in the method provided by the present disclosure, the first consensus node can send the block associated data of the service block to each second consensus node, instead of sending the complete service block to each second consensus node, and each second consensus node can also restore the service block and then reach consensus on the service block. Consensus on the service block can be understood as consensus on the service data. Therefore, this can reduce a volume of data communication in the consensus process of service data, and reduce complexity of communication, thereby improving stability and efficiency of service data consensus in the blockchain network.

Figure 14:
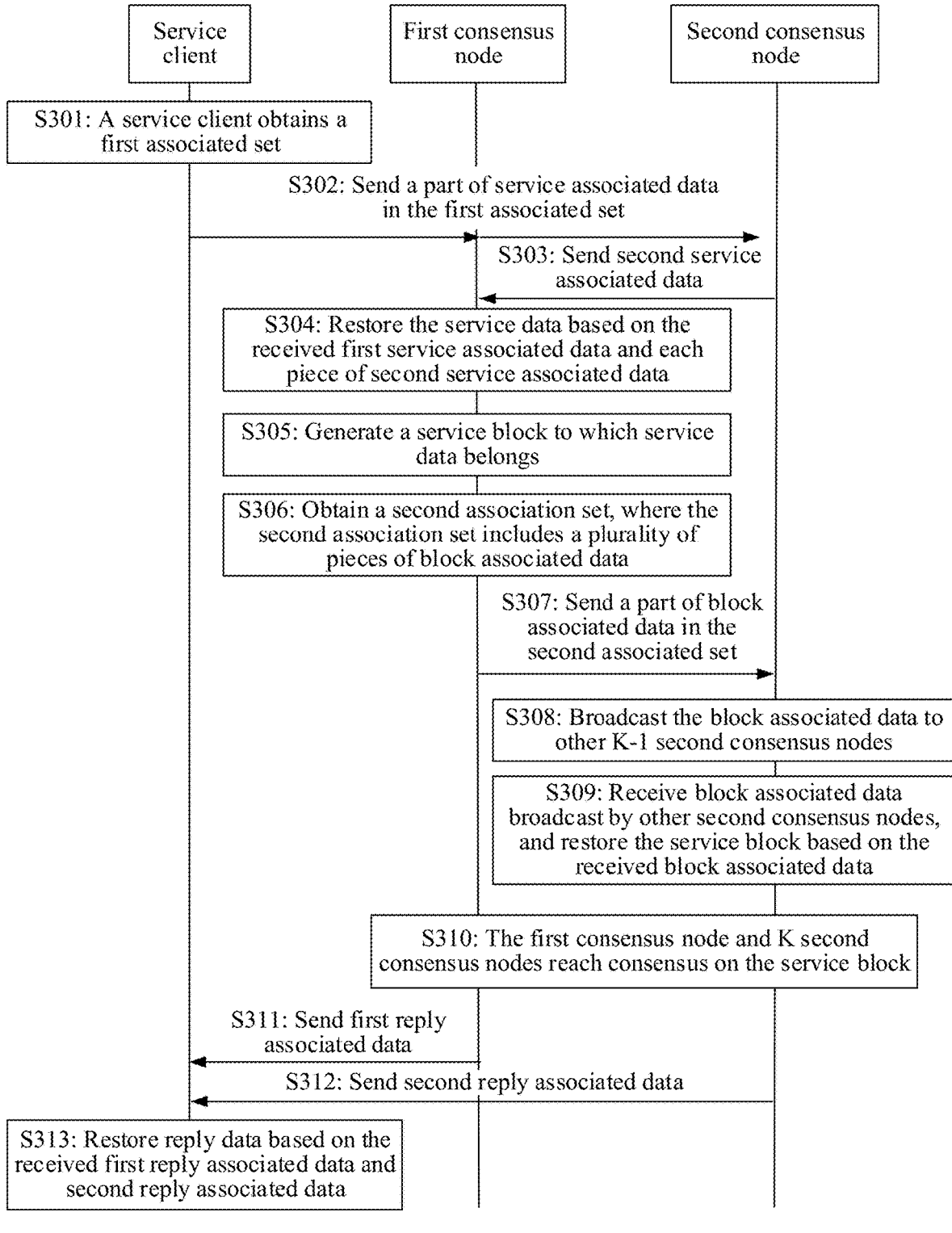
FIG. 14 is a schematic flowchart of another consensus processing method for a blockchain network according to the present disclosure.

In some embodiments, the consensus processing method for a blockchain network provided by the present disclosure is performed through the interaction between a service client and a consensus node. FIG. 14 is a flowchart of a consensus processing method for a blockchain network according to another exemplary embodiment of the present disclosure. An example in which the method is applied to the interaction between the service client and the consensus node is used. Referring to FIG. 14, the method includes:

Step S301: The service client obtains a first associated set, where the first associated set includes a plurality of pieces of service associated data, the plurality of pieces of service associated data include a plurality of pieces of service shard data, and the plurality of pieces of service shard data are obtained by dividing service data.

In some embodiments, for the service data that needs to be sent by the service client, the service client divides the service data to obtain a plurality of pieces of service shard data, and uses the plurality of pieces of service shard data as the service associated data in the first associated set.

In some embodiments, the service client performs redundant calculation on the plurality of pieces of service shard data to obtain at least one piece of service redundant data. The at least one piece of service redundant data is also used as service associated data in the first associated set.

In some embodiments, a number of pieces of service associated data included in the first associated set is equal to or less than a number of consensus nodes in the blockchain network. That is, the sum W+G of the number W of service shard data and the number G of service redundant data included in the first associated set is less than or equal to the number of consensus nodes in the blockchain network. The blockchain network includes a first consensus node and K second consensus nodes, that is, W+G is less than or equal to K+1, and W, G, and K are all positive integers greater than 0.

In some embodiments, the service client can be carried in the terminal device, and the service client can be any application client or webpage client or the like.

Step S302: The service client sends a part of service associated data in the first associated set to each consensus node in the blockchain network.

In some embodiments, when W+G is equal to K+1, that is, the number of pieces of service associated data included in the first associated set is equal to the number of consensus nodes in the blockchain network, the service client sends one piece of service associated data to each consensus node in the blockchain network, and the service associated data sent to each consensus node is different.

In some embodiments, when W+G is less than K+1, that is, the number of pieces of service associated data included in the first associated set is less than the number of consensus nodes in the blockchain network, the service client sends one piece of service associated data to each consensus node in the blockchain network, and some pieces of service associated data in the first associated set may be sent to a plurality of consensus nodes.

For ease of description, the service associated data sent by the service client to the first consensus node is referred to as first service associated data, and the service associated data sent by the service client to each second consensus node is referred to as second service associated data.

In some embodiments, the service client also calculates a hash value of each piece of service associated data based on each piece of service associated data in the first associated set, constructs a first Merkle tree based on the hash value of each pieces service associated data, when sending the first service associated data to the first consensus node, also sends the hash value of the first service associated data and the root node of the first Merkle tree at the same time, and when sending the second service associated data to any second consensus node, also sends the hash value of the second service associated data and the root node of the first Merkle tree at the same time.

In some embodiments, the service client may directly send the service data to the first consensus node without performing the operations of steps S301 and S302. In this implementation, the service client does not send the service data to each second consensus node.

Step S303: The second consensus node receives the second service associated data, and sends the second service associated data to the first consensus node.

The second consensus node is any one of the K second consensus nodes in the blockchain network. The second consensus node receives the second service associated data sent by the service client, and sends the second service associated data to the first consensus node, or broadcasts the second service associated data to the first consensus node and the other K−1 second consensus nodes.

In some embodiments, the second consensus node also receives a hash value of the second service associated data and the root node of the first Merkle tree, and when sending the second service associated data to the first consensus node, also sends the hash value of the second service associated data and the root node of the first Merkle tree. Alternatively, when broadcasting the second service associated data to the first consensus node and the other K−1 second consensus nodes, the second consensus node also broadcasts the hash value of the second service associated data and the root node of the first Merkle tree.

Similar to this second consensus node, the other K−1 second consensus nodes receive, according to the operation of step S303, the second service associated data sent by the service client, and send the received second service associated data to the first consensus node, or the received second service associated data is broadcast to the first consensus node and the other K−1 second consensus nodes.

Step S303 is an optional step. When the service client directly sends the service data to the first consensus node, the second consensus node does not perform the operation of step S303.

Step S304: The first consensus node receives the first service associated data and the second service associated data that is sent by the second consensus node in the blockchain network, and restores the service data based on the received first service associated data and each piece of second service associated data.

In some embodiments, the process of receiving the first service associated data by the first consensus node is: The first consensus node receives first verification associated data and a first verification hash value sent by the service client, where the first verification associated data corresponds to the first service associated data transmitted by the service client, and the first verification hash value is a hash value of the first service associated data. The first consensus node calculates a hash value of the first verification associated data, compares whether the hash value of the first verification associated data is the same as the first verification hash value, and if yes, determines the first verification associated data as the first service associated data.

In some embodiments, for any second consensus node, a process of receiving, by the first consensus node, the second service associated data sent by the second consensus node is: The first consensus node receives second verification associated data and a second verification hash value sent by the second consensus node, where the second verification associated data corresponds to second service associated data sent by the second consensus node, and the second verification hash value is a hash value of the second service associated data. The first consensus node calculates a hash value of the second verification associated data, compares whether the hash value of the second verification associated data is the same as the second verification hash value, and if yes, determines the second verification associated data as the second service associated data.

In step S304, the first consensus node may receive the first service associated data and K pieces of second service associated data, or may receive the first service associated data and less than K pieces of second service associated data (for example, some second consensus nodes have poor communication quality and fail to send the second service associated data to the first consensus node), or may not receive the first service associated data and receive K or less pieces of second service associated data. As long as the total number of pieces of service associated data received by the first consensus node is greater than or equal to W, and the W pieces of service associated data are different from each other, the first consensus node restores the W pieces of service shard data according to the received service associated data, and aggregates the restored W pieces of service shard data to obtain the service data.

In some embodiments, for G pieces of service redundant data, one or more pieces of service redundant data may not be received by the first consensus node. In this case, when restoring the W pieces of service shard data, the first consensus node can further calculate, based on the restored W pieces of service shard data, the service redundant data that is not received, so as to obtain the G pieces of service redundant data.

In some embodiments, the first consensus node also receives the root node of the first Merkle tree sent by the service client. When the W pieces of service shard data are restored, the first consensus node constructs the second Merkle tree based on hash values of the W pieces of service shard data and hash values of the G pieces of service redundant data, compares the root node of the second Merkle tree with the root node of the first Merkle tree, if obtaining through comparison that the root nodes are the same, determines that the restored W pieces of service shard data are credible, and aggregates the restored W pieces of service shard data to obtain the service data of the service client.

Step S304 is an optional step. When the service client directly sends service data to the first consensus node, the first consensus node does not perform the operation of step S304, and instead directly receives the service data.

In some embodiments, the first consensus node may obtain service data of a plurality of service clients at the same time. That is, the first consensus node obtains one or more pieces of service data.

Step S305: The first consensus node generates the service block to which the service data belongs.

In step S305, the first consensus node packages the obtained one or more pieces of service data, to generate the service block to which the one or more pieces of service data belong.

Step S306: The first consensus node obtains a second associated set, where the second associated set includes a plurality of pieces of block associated data, the plurality of pieces of block associated data includes a plurality of pieces of block shard data, and the plurality of pieces of block shard data are obtained by dividing the service block.

In step S306, the first consensus node divides the service block to obtain N pieces of block shard data, and the N pieces of block shard data are block associated data in the second associated set. N is an integer greater than 1.

In some embodiments, the first consensus node further obtains at least one piece of block redundant data based on the plurality of pieces of block shard data, and the block associated data in the second associated set further includes the at least one piece of block redundant data. Implementation is as follows:

The first consensus node obtains M redundant algorithms, where M is positive integer greater than 0, and respectively performs calculation on the plurality of pieces of block shard data according to the M different redundant algorithms, to obtain block redundant data corresponding to each redundant algorithm. Therefore, the second associated set includes N pieces of block shard data and M pieces of block redundant data.

Step S307: The first consensus node sends a part of block associated data in the second associated set to each of the K second consensus nodes.

In some embodiments, when the number of pieces of block associated data in the second associated set is equal to K, the first consensus node sends one piece of block associated data to each second consensus node, and the block associated data sent to each second consensus node is different.

In some embodiments, when the number of pieces of block associated data in the second associated set is less than K, the first consensus node sends one piece of block associated data to each second consensus node, and some pieces of block associated data in the second associated set may be sent to a plurality of consensus nodes.

Step S308: The second consensus node receives the block associated data sent by the first consensus node, and broadcasts the block associated data to the other K−1 second consensus nodes.

Similar to this second consensus node, the other K−1 second consensus nodes also perform the operation of step S308, that is, the K second consensus nodes broadcast, to each other, the block associated data received by each other.

Step S309: The second consensus node receives block associated data broadcast by other second consensus nodes, and restores the service block based on the received block associated data.

When each of the K second consensus nodes receives N or more pieces of different block associated data, the second consensus node restores the service block according to the received block associated data.

Step S310: The first consensus node and the K second consensus nodes reach consensus on the service block, and perform the following step S311 after consensus is reached.

In some embodiments, after each second consensus node restores the service block, the first consensus node and each second consensus node jointly reach consensus on the service block, where the first consensus node and the second consensus node may reach consensus on the service block based on a BFT consensus algorithm. As long as more than a specific number of consensus nodes (for example, 2*(K+1)/3 consensus nodes) reach consensus that the service block is valid, it is determined that consensus on the service block is reached. Therefore, even if a small number of second consensus nodes fail to restore the service block and consequently cannot reach consensus on the service block, this does not affect the consensus result of the first consensus node and all second consensus nodes that can reach consensus on the service block.

Step S311: The first consensus node sends the first reply associated data to the service client, where the first reply associated data is one of a plurality of pieces of reply shard data, or one of at least one piece of reply redundant data.

The plurality of pieces of reply shard data are obtained by dividing the reply data of the data service, and the at least one piece of reply redundant data is calculated based on the plurality of pieces of reply shard data.

After reaching consensus on the service block, the first consensus node generates reply data corresponding to the service data, and divides the reply data to obtain a plurality of pieces of reply shard data, where the plurality of pieces of reply associated data include the plurality of pieces of reply shard data.

In some embodiments, the first consensus node performs redundant calculation based on the plurality of pieces of reply shard data, to obtain at least one piece of reply redundant data, where the at least one piece of reply associated data also includes the at least one piece of reply redundant data, and the number of the plurality of pieces of reply associated data is equal to K+1.

In some embodiments, the first consensus node agrees in advance on reply associated data that is of the plurality of pieces of reply associated data and that is to be returned to the service client. Therefore, the first consensus node selects, as the first reply associated data from the plurality of pieces of reply associated data, the reply associated data that is agreed on and that needs to be returned to the service client.

Step S312: The second consensus node sends the second reply associated data to the service client, where the second reply associated data is one of a plurality of pieces of reply shard data, or one of at least one piece of reply redundant data.

The plurality of pieces of reply shard data are obtained by dividing the reply data of the data service, and the at least one piece of reply redundant data is calculated based on the plurality of pieces of reply shard data.

After reaching consensus on the service block, the second consensus node generates reply data corresponding to the service data, and divides the reply data to obtain a plurality of pieces of reply shard data, where the plurality of pieces of reply associated data include the plurality of pieces of reply shard data.

In some embodiments, the second consensus node performs redundant calculation based on the plurality of pieces of reply shard data, to obtain at least one piece of reply redundant data, where the at least one piece of reply associated data also includes the at least one piece of reply redundant data, and the number of the plurality of pieces of reply associated data is equal to K+1.

The plurality of pieces of reply associated data obtained by the first consensus node are the same as the plurality of pieces of reply associated data obtained by each second consensus node.

In some embodiments, the second consensus node agrees in advance on reply associated data that is of the plurality of pieces of reply associated data and that is to be returned to the service client. Therefore, the second consensus node selects, as the second reply associated data from the plurality of pieces of reply associated data, the reply associated data that is agreed on and that needs to be returned to the service client.

The first consensus node and each second consensus node agree on that associated data that is to be returned to the service client is different.

Similar to this second consensus node, the other K−1 second consensus nodes perform the operation of step S312.

Step S313: The service client receives the first reply associated data sent by the first consensus node and the second reply associated data sent by each second consensus node, and restores the reply data based on the received first reply associated data and second reply associated data.

In this embodiment of the present disclosure, the first consensus node can obtain the second associated set corresponding to the service block to which the service data belongs, and the block associated data in the second associated set includes a plurality of pieces of block shard data obtained by dividing the service block; send each piece of block associated data in the second associated set to K second consensus nodes respectively; where all the second consensus nodes receive block associated data and the K second consensus nodes broadcast, to each other, block associated data respectively received by each other, so that each second consensus node restores the service block; and reach consensus on the service block between the first consensus node and the K second consensus nodes. As can be seen, in the method provided by the present disclosure, the first consensus node can send the block associated data to each second consensus node, instead of sending the complete service block to each second consensus node, and each second consensus node can also restore the service block and then reach consensus on the service block. Therefore, this can reduce a volume of data communication in the consensus process, and reduce complexity of communication, thereby improving stability and efficiency of service data consensus in the blockchain network.

Figure 15:
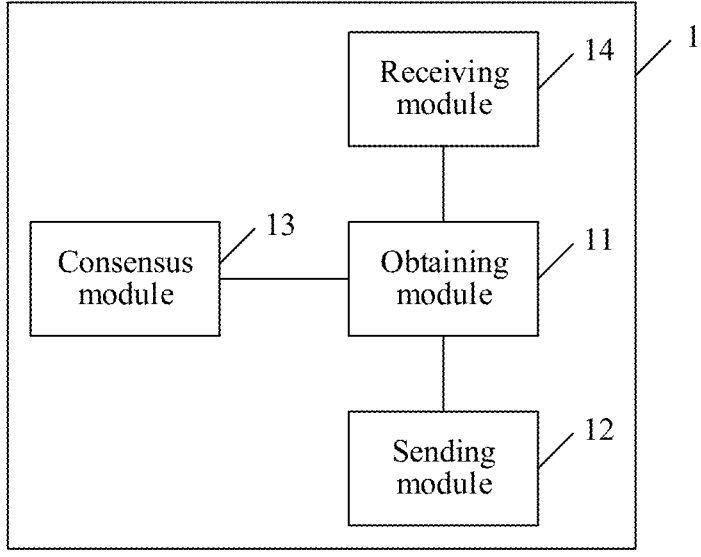
FIG. 15 is a schematic structural diagram of a consensus processing apparatus for a blockchain network according to the present disclosure.

FIG. 15 is a schematic structural diagram of a consensus processing apparatus for a blockchain network according to the present disclosure. The consensus processing apparatus for a blockchain network can be a computer program (including program code) running on a computer device, for example, the consensus processing apparatus for a blockchain network is application software, and the consensus processing apparatus for a blockchain network can be configured to perform corresponding steps in the method provided by the embodiments of the present disclosure. The consensus processing apparatus for a blockchain network can be applied to the above-mentioned first consensus node. As shown in FIG. 15, the consensus processing apparatus 1 for a blockchain network can include: an obtaining module 11, a transmission module 12, and a consensus module 13.

The obtaining module 11 is configured to obtain an associated set, the associated set including a plurality of pieces of block associated data, the plurality of pieces of block associated data including a plurality of pieces of block shard data, and the plurality of pieces of block shard data being obtained by dividing a service block on which consensus is to be reached.

The transmission module 12 is configured to transmit a part of block associated data in the associated set to the second consensus nodes, so that the second consensus nodes broadcast, to each other, block associated data received by each other and restore the service block.

The consensus module 13 is configured to reach consensus on the service block between the apparatus 1 and the plurality of second consensus nodes.

In one embodiment, the plurality of pieces of block associated data further include at least one piece of block redundant data, and the at least one piece of block redundant data is obtained by performing redundant calculation on the plurality of pieces of block shard data.

In one embodiment, the obtaining module 11 is further configured to respectively perform redundant calculation on the plurality of pieces of block shard data according to each of M redundant algorithms, to obtain block redundant data corresponding to each redundant algorithm, where M is a positive integer.

In one embodiment, the obtaining module 11 is further configured to determine a value of M according to a network stability level of the blockchain network.

In one embodiment, the service block includes a plurality of pieces of block field data, and each of the plurality of pieces of block shard data includes a part of block field data in the service block.

In one embodiment, a number of pieces of block associated data included in the associated set is equal to a number of the plurality of second consensus nodes.

In one embodiment, the apparatus 1 further includes a receiving module 14.

The receiving module 14 is configured to receive a plurality of pieces of service associated data, where the plurality of pieces of service associated data include first service associated data that is transmitted by a service client and second service associated data that is transmitted by the service client and forwarded by each second consensus node, the plurality of pieces of service associated data include a plurality of pieces of service shard data, and the plurality of pieces of service shard data are obtained by the service client by dividing the service data.

The obtaining module 11 is further configured to obtain the service block based on the plurality of pieces of service associated data.

In one embodiment, the plurality of pieces of service associated data further include at least one piece of service redundant data, and the at least one piece of service redundant data is obtained by the service client by performing redundant calculation on the plurality of pieces of service shard data.

The obtaining module 11 is configured to restore the service data based on the plurality of pieces of service shard data and the at least one piece of service redundant data; and obtain the service block based on the service data.

In one embodiment, the receiving module 14 is further configured to receive first verification associated data and a first verification hash value, where the first verification associated data corresponds to the first service associated data transmitted by the service client, and the first verification hash value is a hash value of the first service associated data.

The obtaining module 11 is further configured to calculate a hash value of the first verification associated data, and when the hash value of the first verification associated data is the same as the first verification hash value, determine the first verification associated data as the first service associated data.

In one embodiment, the receiving module 14 is further configured to receive second verification associated data and a second verification hash value, where the second verification associated data corresponds to second service associated data transmitted by a second consensus node, and the second verification hash value is a hash value of the second service associated data.

The obtaining module 11 is further configured to calculate a hash value of the second verification associated data, and when the hash value of the second verification associated data is the same as the second verification hash value, determine the second verification associated data as the second service associated data.

In one embodiment, the receiving module 14 is further configured to receive a root node of a first service Merkle tree, where the first service Merkle tree is generated by the service client according to hash values of the plurality of pieces of service associated data sent by the service client.

The obtaining module 11 is configured to construct a second Merkle tree according to hash values of the plurality of pieces of received service associated data; and when the root node of the first service Merkle tree is the same as a root node of the second service Merkle tree, obtain the service block based on the plurality of pieces of received service associated data.

In one embodiment, the obtaining module 11 is configured to generate reply data for the service data.

The transmission module 12 is further configured to transmit first reply associated data to the service client, where the first reply associated data is one of a plurality of pieces of reply shard data, or is one of at least one piece of reply redundant data, the plurality of pieces of reply shard data are obtained by dividing the reply data, and the at least one piece of reply redundant data is obtained by performing redundant calculation on the plurality of pieces of reply shard data.

According to an embodiment of the present disclosure, the steps in the consensus processing method for a blockchain network shown in FIG. 2 can be executed by the modules of the consensus processing apparatus 1 for a blockchain network shown in FIG. 15. For example, steps S101 and S102 shown in FIG. 2 may be performed by the obtaining module 11 in FIG. 15, step S103 shown in FIG. 2 may be performed by the transmission module 12 in FIG. 15, and step S104 shown in FIG. 2 may be performed by the consensus module 14 in FIG. 15.

In the present disclosure, the obtaining module can obtain the associated set, where the associated set includes the plurality of pieces of block shard data obtained by dividing the service block, and the transmission module sends each piece of block associated data in the associated set to the plurality of second consensus nodes. All the second consensus nodes receive block associated data and broadcast, to each other, block associated data respectively received by each other, so that each second consensus node restores the service block. The consensus module reaches consensus on the service block between the apparatus and each second consensus node. It can be seen that the transmission module sends the block associated data of the service block to each second consensus node, instead of sending the complete service block to each second consensus node, each second consensus node can restore the service block, and then each consensus node can reach consensus on the service block. Therefore, this can reduce a volume of data sent by the transmission module, avoid a single-point bottleneck, reduce a volume of data communication in the consensus process of service data, and reduce complexity of communication, thereby improving stability and efficiency of service data consensus in the blockchain network.

Figure 16:
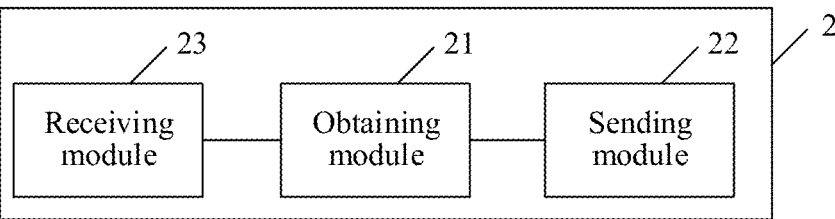
FIG. 16 is a schematic structural diagram of a consensus processing apparatus for a blockchain network according to the present disclosure.

FIG. 16 is a schematic structural diagram of a consensus processing apparatus for a blockchain network according to the present disclosure. The consensus processing apparatus for a blockchain network can be a computer program (including program code) running on a computer device, for example, the consensus processing apparatus for a blockchain network is application software, and the consensus processing apparatus for a blockchain network can be configured to perform corresponding steps in the method provided by the embodiments of the present disclosure. The consensus processing apparatus for a blockchain network can be applied to the above-mentioned service client. As shown in FIG. 16, the consensus processing apparatus 2 for a blockchain network can include: an obtaining module 21 and a transmission module 22.

The obtaining module 21 is configured to obtain an associated set, the associated set including a plurality of pieces of service associated data, the plurality of pieces of service associated data including a plurality of pieces of service shard data, and the plurality of pieces of service shard data being obtained by dividing service data.

The transmission module 22 is configured to transmit a part of service associated data in the associated set to each consensus node in the blockchain network, so that each second consensus node transmits service associated data respectively received by the second consensus node to the first consensus node, and the first consensus node restores the service data based on the received service associated data and performs consensus processing on the service data.

In one embodiment, the plurality of pieces of service associated data further include at least one piece of service redundant data, and the at least one piece of service redundant data is obtained by performing redundant calculation on the plurality of pieces of service shard data.

In one embodiment, the service data includes a plurality of pieces of service field data, and each of the plurality of pieces of service shard data includes a part of service field data in the service data.

In one embodiment, a number of pieces of service associated data in the associated set is equal to a number of consensus nodes included in the blockchain network.

In one embodiment, the apparatus 1 further includes: a receiving module 23.

The receiving module 23 is configured to receive a plurality of pieces of reply associated data, where the plurality of pieces of reply associated data include reply associated data returned by the consensus node in the blockchain network after consensus on the service data is reached, and the returned reply associated data is obtained by the consensus node based on reply data corresponding to the service data.

The obtaining module 21 is further configured to restore the reply data based on the plurality of pieces of reply associated data.

In one embodiment, the receiving module 23 is further configured to receive a root node that is of a third Merkle tree and that is returned by the first consensus node after consensus on the service data is reached, where the third Merkle tree is generated by the first consensus node based on the reply data.

The obtaining module 21 is configured to construct a fourth Merkle tree according to hash values of the plurality of pieces of reply associated data; and when the root node of the third Merkle tree is the same as a root node of a fourth Merkle tree, restore the reply data based on the plurality of pieces of reply associated data.

According to an embodiment of the present disclosure, the steps in the consensus processing method for a blockchain network shown in FIG. 13 can be executed by the modules of the consensus processing apparatus 2 for a blockchain network shown in FIG. 16. For example, step S201 shown in FIG. 13 may be performed by the obtaining module 21 in FIG. 16, and step S202 shown in FIG. 13 may be performed by the transmission module 22 in FIG. 16.

In the present disclosure, the obtaining module can obtain the associated set, where the associated set includes the plurality of pieces of service shard data obtained by dividing the service data; and the transmission module sends a part of service associated data in the associated set to each consensus node. In this way, each second consensus node sends service associated data respectively received by the second consensus node to the first consensus node, and the first consensus node restores the service data based on the received service associated data sent by the service client and service associated data sent by each second consensus node, and reaches consensus on the service data. It can be seen that the transmission module sends service associated data to each consensus node, instead of sending the complete service data to each consensus node, and the first consensus node can restore the service data and then reach consensus on the service data. Therefore, this can reduce a volume of data communication in the consensus process of service data, and reduce complexity of communication, thereby improving stability and efficiency of service data consensus in the blockchain network.

The term module (and other similar terms such as submodule, unit, subunit, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

Figure 17:
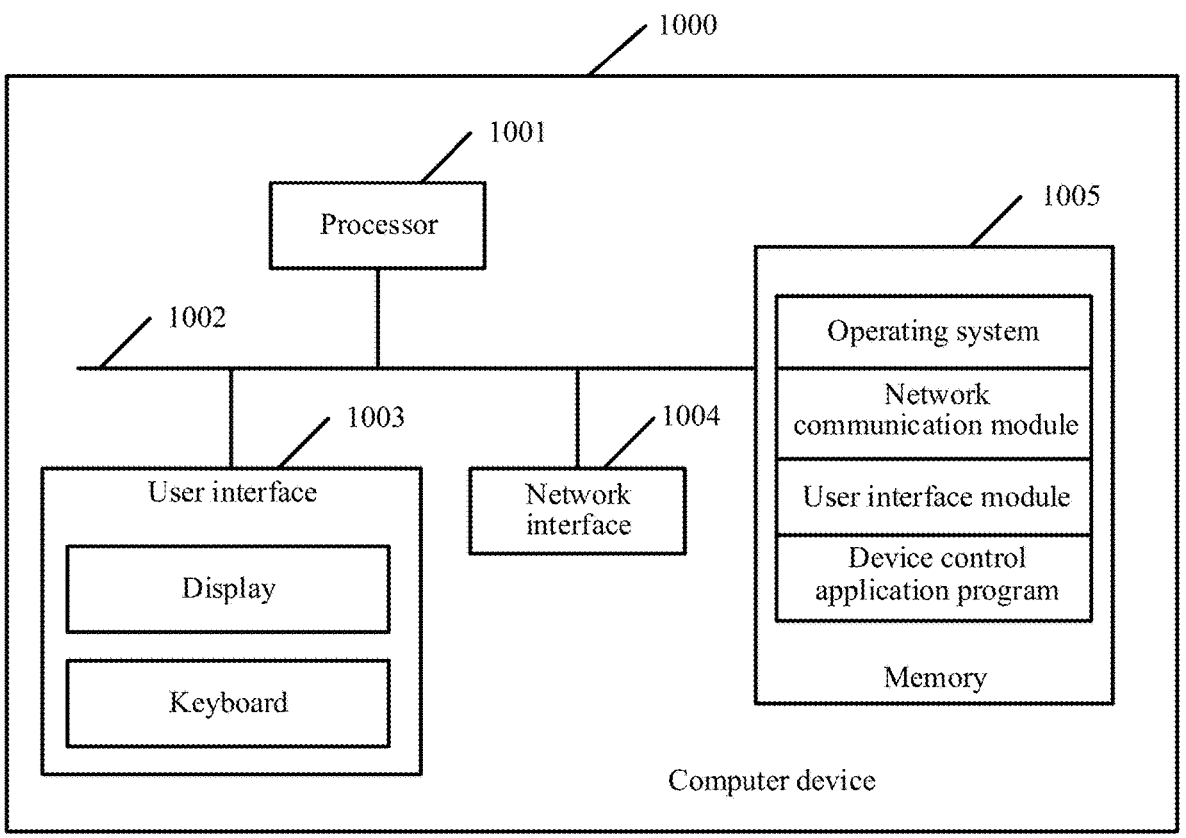
FIG. 17 is a schematic structural diagram of a computer device according to the present disclosure.

FIG. 17 is a schematic structural diagram of a computer device according to the present disclosure. As shown in FIG. 17, a computer device 1000 may include: a processor 1001, a network interface 1004, and a memory 1005, and in addition, the computer device 1000 may further include: a user interface 1003 and at least one communication bus 1002. The communication bus 1002 is configured to implement connection and communication between these components. The user interface 1003 may include a display (Display) and a keyboard (Keyboard). In some embodiments, the user interface 1003 may further include a standard wired interface and wireless interface. The network interface 1004 may include a standard wired interface and wireless interface (for example, a WiFi interface). The memory 1005 may be a high-speed RAM memory, or may be a non-volatile memory (non-volatile memory), for example, at least one magnetic disk memory. In some embodiments, the memory 1005 may be at least one storage apparatus that is located far away from the processor 1001. As shown in FIG. 17, the memory 1005 used as a computer storage medium may include an operating system, a network communication module, a user interface module, and a device control application program.

In the computer device 1000 shown in FIG. 17, the network interface 1004 can provide a network communication function. The user interface 1003 is mainly configured to provide an input interface for a user. The processor 1001 can be configured to call the device control application program stored in the memory 1005, so as to perform the operations performed by the first consensus node, the second consensus node, or the service client in the procedure of the foregoing consensus processing method for a blockchain network.

The present disclosure further provides a computer-readable storage medium. The computer-readable storage medium stores computer programs executed by the foregoing consensus processing apparatus 1 for a blockchain network or the foregoing consensus processing apparatus 2 for a blockchain network. The computer program includes program instructions. When executing the program instructions, a processor can perform the consensus processing method for a blockchain network described in the foregoing embodiments corresponding to FIG. 2, FIG. 13, or FIG. 14. Therefore, details are not repeated herein. In addition, the description of beneficial effects of the same method are not described herein again. For technical details that are not disclosed in the computer storage medium embodiments of the present disclosure, refer to the descriptions of the method embodiments of the present disclosure.

As an example, the program instructions may be deployed for execution on one computer device, or deployed for execution on a plurality of computer devices located at one location, or distributed on a plurality of computer devices distributed at a plurality of locations and interconnected through a communication network, where the plurality of computer devices distributed at a plurality of locations and interconnected through a communication network can form a blockchain network.

The computer-readable storage medium may be the consensus processing apparatus for a blockchain network provided by any one of the foregoing embodiments or an internal storage unit of the computer device, such as a hard disk or a memory of the computer device. The computer-readable storage medium may also be an external storage device of the computer device, such as a plug-in hard disk equipped on the computer device, a smart memory card (SMC), a secure digital (SD) card, a flash card (flash card), etc. Further, the computer-readable storage medium may also include both the internal storage unit and the external storage device of the computer device. The computer-readable storage medium is configured to store the computer program and other programs and data required by the computer device. The computer-readable storage medium can also be configured to temporarily store data that has been output or will be output.

The present disclosure provides a computer program product or a computer program, including computer instructions stored in a computer-readable storage medium. A processor of a computer device reads the computer instructions from the computer-readable storage medium, and the processor executes the computer instructions, so that the computer device performs the consensus processing method for a blockchain network described in the foregoing embodiments corresponding to FIG. 2, FIG. 13, or FIG. 14. Therefore, details are not repeated herein. In addition, the description of beneficial effects of the same method are not described herein again. For technical details that are not disclosed in the computer-readable storage medium embodiments of the present disclosure, refer to the descriptions of the method embodiments of the present disclosure.

What is disclosed above is merely exemplary embodiments of the present disclosure, and certainly is not intended to limit the scope of the claims of the present disclosure. Therefore, equivalent variations made in accordance with the claims of the present disclosure shall fall within the scope of the present disclosure.

What is claimed is:

1. A consensus processing method for a blockchain network, the blockchain network comprising a first consensus node and a plurality of second consensus nodes, the method being executed by the first consensus node, and the method comprising:

obtaining an associated set, the associated set comprising a plurality of pieces of block associated data, the plurality of pieces of block associated data comprising a plurality of pieces of block shard data and at least one piece of block redundant data, the plurality of pieces of block shard data being obtained by dividing a service block on which consensus is to be reached, and the at least one piece of block redundant data being obtained by: respectively performing redundant calculation on the plurality of pieces of block shard data according to each of M redundant algorithms, to obtain block redundant data corresponding to each redundant algorithm, wherein M is a positive integer;

transmitting a part of the block associated data in the associated set to the second consensus nodes respectively, so that the second consensus nodes broadcast, to each other, the block associated data received by each other and restore the service block; and reaching consensus on the service block between the first consensus node and the plurality of second consensus nodes.

2. The method according to claim 1, wherein the method further comprises:

determining a value of M according to a network stability level of the blockchain network.

3. The method according to claim 1, wherein the service block comprises a plurality of pieces of block field data, and each of the plurality of pieces of block shard data comprises a part of the block field data in the service block.

4. The method according to claim 1, wherein a number of pieces of block associated data comprised in the associated set is equal to a number of the plurality of second consensus nodes.

5. The method according to claim 1, wherein the method further comprises:

receiving a plurality of pieces of service associated data, wherein the plurality of pieces of service associated data comprise first service associated data transmitted by a service client and second service associated data transmitted by the service client and forwarded by each second consensus node, the plurality of pieces of service associated data comprise a plurality of pieces of service shard data, and the plurality of pieces of service shard data are obtained by the service client by dividing the service data; and obtaining the service block based on the plurality of pieces of service associated data.

6. The method according to claim 5, wherein the plurality of pieces of service associated data further comprise at least one piece of service redundant data, and the at least one piece of service redundant data is obtained by the service client by performing redundant calculation on the plurality of pieces of service shard data; and the obtaining the service block based on the plurality of pieces of service associated data comprises:

restoring the service data based on the plurality of pieces of service shard data and the at least one piece of service redundant data; and obtaining the service block based on the service data.

7. The method according to claim 5, wherein the receiving the first service associated data transmitted by the service client comprises:

receiving first verification associated data and a first verification hash value, wherein the first verification associated data corresponds to the first service associated data transmitted by the service client, and the first verification hash value is a hash value of the first service associated data; and calculating a hash value of the first verification associated data, and when the hash value of the first verification associated data is the same as the first verification hash value, determining the first verification associated data as the first service associated data.

8. The method according to claim 5, wherein the receiving the second service associated data transmitted by the second consensus node comprises:

receiving second verification associated data and a second verification hash value, wherein the second verification associated data corresponds to second service associated data transmitted by one of the second consensus nodes, and the second verification hash value is a hash value of the second service associated data; and calculating a hash value of the second verification associated data, and when the hash value of the second verification associated data is the same as the second verification hash value, determining the second verification associated data as the second service associated data.

9. The method according to claim 5, wherein the obtaining the service block based on the plurality of pieces of service associated data comprises:

receiving a root node of a first service Merkle tree, wherein the first service Merkle tree is generated by the service client according to hash values of the plurality of pieces of service associated data transmitted by the service client;

constructing a second Merkle tree according to the hash values of the plurality of pieces of received service associated data; and when the root node of the first service Merkle tree is the same as a root node of the second service Merkle tree, obtaining the service block based on the plurality of pieces of received service associated data.

10. The method according to claim 5, wherein the method further comprises:

generating reply data for the service data; and transmitting first reply associated data to the service client, wherein the first reply associated data is one of a plurality of pieces of reply shard data, or is one of at least one piece of reply redundant data, the plurality of pieces of reply shard data are obtained by dividing the reply data, and the at least one piece of reply redundant data is obtained by performing redundant calculation on the plurality of pieces of reply shard data.

11. A consensus processing apparatus for a blockchain network, the blockchain network comprises a first consensus node hosted by the apparatus and a plurality of second consensus nodes, and the apparatus comprises a memory and a processor, the memory storing a computer program, and the computer program, when executed by the processor, causing the processor to perform:

obtaining an associated set, the associated set comprising a plurality of pieces of block associated data, the plurality of pieces of block associated data comprising a plurality of pieces of block shard data and at least one piece of block redundant data, the plurality of pieces of block shard data being obtained by dividing a service block on which consensus is to be reached, and the at least one piece of block redundant data being obtained by: respectively performing redundant calculation on the plurality of pieces of block shard data according to each of M redundant algorithms, to obtain block redundant data corresponding to each redundant algorithm, wherein M is a positive integer;

transmitting a part of the block associated data in the associated set to the second consensus nodes respectively, so that the second consensus nodes broadcast, to each other, the block associated data received by each other and restore the service block; and reaching consensus on the service block between the first consensus node and the plurality of second consensus nodes.

12. The apparatus according to claim 11, wherein the processor is further configured to perform:

determining a value of M according to a network stability level of the blockchain network.

13. The apparatus according to claim 11, wherein the service block comprises a plurality of pieces of block field data, and each of the plurality of pieces of block shard data comprises a part of the block field data in the service block.

14. The apparatus according to claim 11, wherein a number of pieces of block associated data comprised in the associated set is equal to a number of the plurality of second consensus nodes.

15. The apparatus according to claim 11, wherein the processor is further configured to perform:

receiving a plurality of pieces of service associated data, wherein the plurality of pieces of service associated data comprise first service associated data transmitted by a service client and second service associated data transmitted by the service client and forwarded by each second consensus node, the plurality of pieces of service associated data comprise a plurality of pieces of service shard data, and the plurality of pieces of service shard data are obtained by the service client by dividing the service data; and obtaining the service block based on the plurality of pieces of service associated data.

16. A non-transitory computer readable storage medium, storing a computer program, the computer program, when being executed by a processor of a first consensus node in a blockchain network, causing the processor of the first consensus node to perform:

obtaining an associated set, the associated set comprising a plurality of pieces of block associated data, the plurality of pieces of block associated data comprising a plurality of pieces of block shard data and at least one piece of block redundant data, the plurality of pieces of block shard data being obtained by dividing a service block on which consensus is to be reached, and the at least one piece of block redundant data being obtained by: respectively performing redundant calculation on the plurality of pieces of block shard data according to each of M redundant algorithms, to obtain block redundant data corresponding to each redundant algorithm, wherein M is a positive integer;

respectively transmitting a part of the block associated data in the associated set to a plurality of second consensus nodes in the blockchain network, wherein the second consensus nodes broadcast, to each other, the block associated data received by each other and restore the service block; and reaching consensus on the service block between the first consensus node and the plurality of second consensus nodes.

* * * * *